United States Patent
Ruelke et al.

(10) Patent No.: US 8,320,858 B2
(45) Date of Patent: Nov. 27, 2012

(54) APPARATUS FOR RECEIVING MULTIPLE INDEPENDENT RF SIGNALS SIMULTANEOUSLY AND METHOD THEREOF

(75) Inventors: Charles R. Ruelke, Margate, FL (US); Ariel L. Galan, Ft. Lauderdale, FL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 173 days.

(21) Appl. No.: 12/951,235

(22) Filed: Nov. 22, 2010

(65) Prior Publication Data
US 2012/0129480 A1 May 24, 2012

(51) Int. Cl.
*H04B 1/04* (2006.01)
(52) U.S. Cl. ..... 455/130; 455/138; 455/140; 455/168.1; 455/209
(58) Field of Classification Search ............. 455/130, 455/138, 140, 168.1, 209, 236.1, 255, 264, 455/293, 315, 316, 326
See application file for complete search history.

(56) References Cited

U.S. PATENT DOCUMENTS

| | | | |
|---|---|---|---|
| 7,346,128 B2 | 3/2008 | Hsu et al. | |
| 2003/0056221 A1 | 3/2003 | Zhang et al. | |
| 2006/0084469 A1* | 4/2006 | Malone et al. | 455/552.1 |
| 2007/0117523 A1* | 5/2007 | Weber et al. | 455/81 |
| 2009/0253396 A1* | 10/2009 | Deguchi et al. | 455/234.1 |

* cited by examiner

*Primary Examiner* — Tuan Pham
(74) *Attorney, Agent, or Firm* — Anthony P. Curtis; Daniel R. Bestor

(57) ABSTRACT

An apparatus and method for receiving and processing multiple independent, uncorrelated RF signals is presented. The apparatus includes a Hybrid-Direct Conversion Receiver incorporating front end branches, protocol-specific digital processing branches, an interference detector, a correlator, and an offset control for controlling oscillator sources. The front end branches each contain a preselector that filters received signals and a mixer that down converts the received signal to an IF offset from a reference frequency by a unique offset. The bandwidth of an IF processor is partitioned into sub-channels corresponding to the different offsets and is wider than the combination of the sub-channels. The interference detector and correlator determine whether a particular desired signal is degraded by interference signals and select a new sub-channel. This information is provided to the offset control, which adjusts a LO source coupled to the corresponding down mixer accordingly.

19 Claims, 8 Drawing Sheets

APPARATUS FOR RECEIVING MULTIPLE INDEPENDENT RF SIGNALS SIMULTANEOUSLY AND METHOD THEREOF

TECHNICAL FIELD

The present application relates to a receiver apparatus for receiving simultaneous multiple radio frequency (RF) signals. In particular, in-phase (I) and quadrature-phase (Q) components of the RF signals are integrated to preserve the desired received information while mitigating undesired co-channel and spurious response interference.

BACKGROUND

Software Defined Radio (SDR) systems are adaptable to many different protocols, and operate over a wide range of different RF bands having varying channel spacing. As the prevalence of multi-band, multi-protocol SDR systems has increased, use requirements have expanded to include the capability of simultaneously receiving multiple RF signals. Each RF signal is composed of complex IQ signals and is transmitted over its own unique channel. Each channel is able to be spectrally located within any band of operation as may be appropriate for the SDR application.

A Direct Conversion Receiver (DCR) is ideally suited for SDR applications due to its relatively low cost, small size, and operational flexibility over a wide range of channel spacing and RF bands. A receiver may be referred to as a DCR if the down conversion mixer (also referred to as a down mixer) is sourced by a Local Oscillator (LO) having a frequency approximately equal to the desired RF carrier frequency. A DCR receiver may also include receiver systems where the frequency difference between the LO and the desired RF carrier signal is less than a specified bandwidth (BW) typically below 1 MHz to 2 MHz, which may also be called a Very Low Intermediate Frequency (VLIF) configuration for the DCR topology. Conventional SDR architectures support simultaneous reception of multiple RF signals over multiple RF channels by incorporating parallel, stand-alone receivers for each RF channel being monitored. However, the use of parallel receivers is generally expensive and consumes an increased amount of power, as well as incurring a significant size penalty to accommodate the multiple receivers.

It is desirable to create a Hybrid DCR (H-DCR) configuration to simultaneously receive RF signals on multiple RF channels without incurring significant cost and size penalties.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Figure 1:
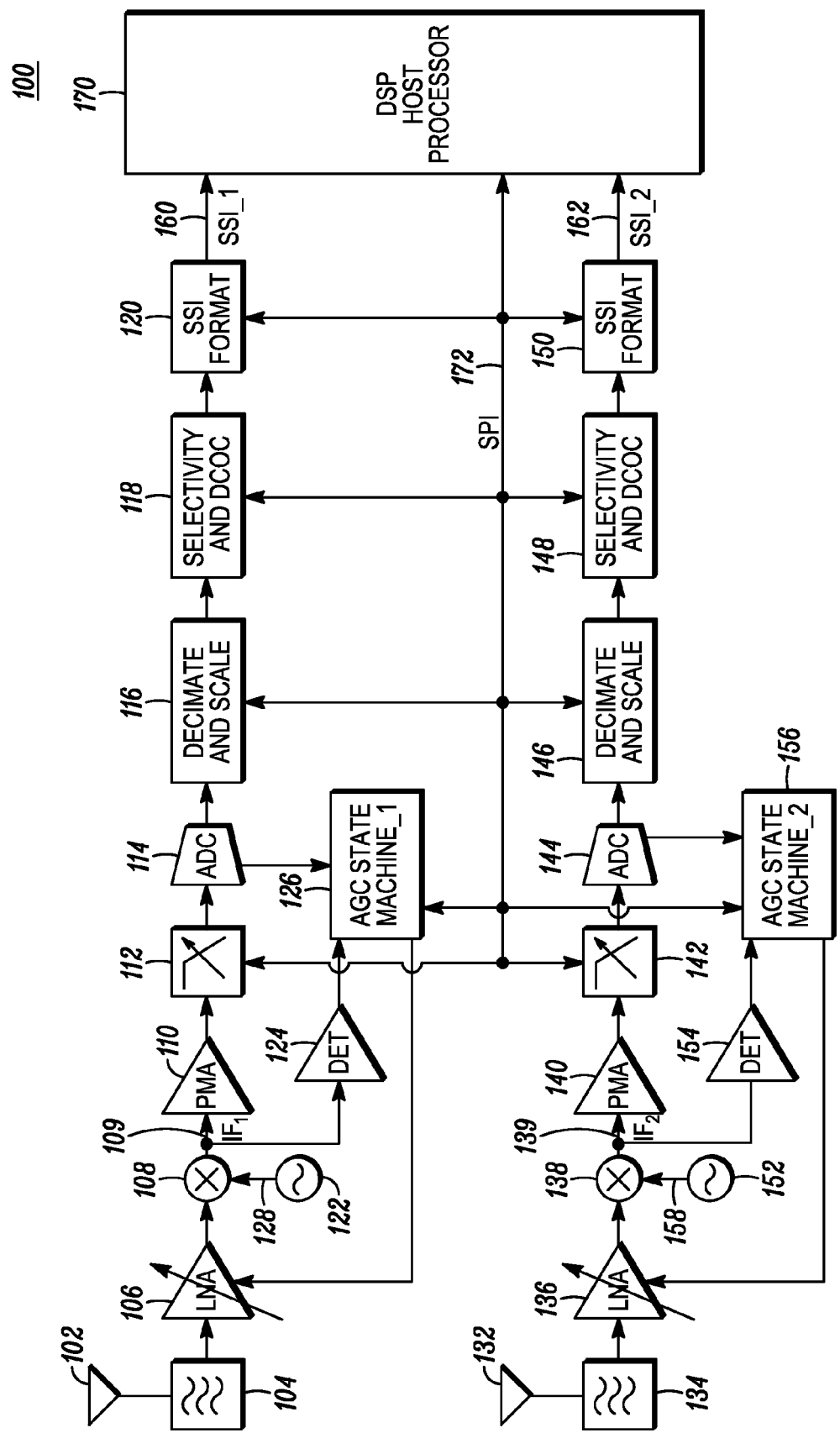
FIG. 1 depicts one embodiment of a block schematic diagram of a receiver system that is capable of receiving independent, non-coherent RF signals on independent channels.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

A Hybrid-Direct Conversion Receiver (H-DCR) topology is provided that is capable of receiving different independent, non-coherent RF signals simultaneously over different RF channels while minimizing the size and cost of the receiver system. The H-DCR system incorporates multiple RF down conversion mixers and LO sources, one mixer stage for each receiver channel that is to be monitored simultaneously. To receive multiple desired RF signals simultaneously, each of the received RF signals are transmitted over a unique RF channel. The H-DCR system subsequently down mixes each unique RF channel using a dedicated mixer and thereby converts the received RF signal for each channel to a dedicated, substantially interference-free baseband sub-channel within a particular bandwidth. The sub-channels are subsequently processed in parallel using a common baseband signal processing apparatus.

The output signal from each of the down conversion mixers is a quadrature IQ signal, where the IQ output signal for a given mixer incorporates a unique Local Oscillator (LO)-to-RF offset. The LO-to-RF offset at each mixer output defines the baseband sub-channel that has been designated for a particular received RF signal. Each baseband sub-channel is designed to preserve the desired modulated information contained in the IQ output signal of the associated mixer while minimizing the undesired co-channel and cross-coupled spurious interference responses. If interference is detected for a particular sub-channel, an agile-LO controller adjusts the LO-to-RF offset for the appropriate mixer in real-time to select a different, substantially interference-free sub-channel. Each mixer LO source incorporates an agile-LO adjustment capability, with the system processor continuously monitoring the interference status of the available baseband sub-channels. As used herein, the term "substantially interference-free" indicates that existing interference on a sub-channel is small enough so as to not unacceptably degrade the desired signal occupying the sub-channel. For digital protocols, a Bit Error Rate (BER) metric may be used to quantify degradations caused by interference, where a sub-channel may be termed substantially interference-free if the desired signal BER is less than 1% to 5%. For analog received signals, such as direct analog frequency modulated (FM) received signals, a sub-channel may be termed substantially interference-free if the desired Signal-to-Noise ratio (SNR) of the desired signal is greater than 15 dB to 20 dB. If a desired signal is not currently being received, a sub-channel is said to be substantially interference-free if the sum-of-squares (SOS) energy envelope estimate for that sub-channel is below 10 dB.

To better illustrate the advantages of the H-DCR system, general techniques for monitoring multiple RF signals from multiple channels simultaneously are first discussed. FIG. 1 depicts a block schematic diagram of a dual receiver system 100 that is capable of receiving independent, non-coherent RF signal communicated over channels. From FIG. 1, a first RF signal received at antenna 102 is subsequently filtered at preselector 104 to attenuate undesired RF signals that are located outside of the frequency range of interest. Simultaneous to receiving the first RF signal, a second RF signal received at antenna 132 is subsequently filtered at preselector 134. Preselectors 104 and 134 use a Band Pass Filter (BPF) topology having a pass-band bandwidth (BW) of 5 MHz to 100 MHz or greater. The receiver system 100 may include a plurality of preselector filters having different topologies as is known in the art.

Each of the first filtered RF signal from preselector 104 and the second filtered RF signal from preselector 134 is connected to Low Noise Amplifier (LNA) 106 and 136 respectively. Both LNA 106 and LNA 136 have adjustable gain to independently and simultaneously amplify the first and second filtered RF signals. Independent gain adjustment for LNA 106 and LNA 136 is provided using a dedicated automatic gain control (AGC) system associated with the particular LNA. As shown, the gain of LNA 106 is adjusted using the AGC control signal provided by AGC state machine 126, while the gain of LNA 136 is adjusted using the AGC control signal provided by AGC state machine 156. The AGC control signals from AGC state machines 126 and 156 are adjusted independently so that the output signal from the corresponding LNA maintains a desired Signal-to-Noise Ratio (SNR) in order to maximize the fidelity of the desired modulated information.

Each of the output signals for LNA 106 and 136 is provided to a mixer 108 and 138 respectively, which mixes the first and second received RF signal with a local dedicated oscillator (LO) signal to produce an appropriate Intermediate Frequency (IF) output. The first received RF signal is mixed with LO signal 128 at mixer 108 to generate signal $IF_1$ 109 at the output of mixer 108, while simultaneously the second received RF signal is mixed with LO signal 158 at mixer 138 to generate signal $IF_2$ 139 at the output of mixer 138. LO signal 128 is generated by LO source 122, while LO signal 158 is generated by LO source 152, with each LO signal being independent of each other. The IF signals 109 and 139 are each composed of their constituent baseband in-phase (I) and baseband quadrature-phase (Q) signals. Only one of the quadrature signal paths for each mixer 108 and 138 is shown in FIG. 1 for convenience.

LO sources 122 and 152 of FIG. 1 include their own Frequency Generation Unit (FGU) as part of a dedicated, closed loop Phased-Lock-Loop (PLL) systems as is well known in the art. Both LO sources 122 and 152 may also include one or more Voltage Controlled Oscillator(s) (VCO), and may either share a common reference oscillator source or use different oscillator sources as part of their dedicated PLL systems. A particular VCO circuit block (not shown) may not be used by different FGUs at the same time; however, a given VCO may be "time shared" between the FGUs and used in a particular PLL if is not active in a different FGU's PLL system at the time. Although not shown, both LO sources 122 and 152 are configurable by Serial Port Interface (SPI) 172 through which host processor 170 controls changes in the operating frequency of the LO signals to mixers 108 and 138.

The IQ signal pairs, one pair that comprises $IF_1$ signal 109 and a different IQ pair that comprises $IF_2$ signal 139 are subsequently processed by their respective analog IQ processing blocks. As shown, $IF_1$ signal 109 is sequentially processed by Post Mixer Amplifier (PMA) 110, baseband gain and filtering block 112 and finally converted to a first sampled receive signal at Analog to Digital Converter (ADC) 114. Simultaneous to processing of $IF_1$ signal 109, $IF_2$ signal 139 is processed by PMA 140, baseband gain and filtering block 142 and finally converted to a second sampled receive signal at ADC 144. The use of PMA 110 and 140 and the baseband gain and filtering blocks 112 and 142 further increase the SNR of the desired on-channel signal within the respective received RF signal, relative to the ambient noise of the receiver system.

An on-channel signal as defined herein includes any signal, desired or undesired, that resides within an active receive channel. An active receive channel is that channel that is associated with a LO frequency currently generated by an LO source. The active receive channel will have an associated channel spacing, where the channel spacing will encompass the modulation bandwidth of the on-channel signal. An active receive channel will be affiliated with a specific portion of spectrum, where the spectral affiliation may associate simultaneously in the RF, IF and/or baseband spectrum. A desired on-channel signal will be that on-channel signal that contains the desired modulated information embedded into the desired received signal that is being processed by the receiver systems described herein. An undesired on-channel signal is any other on-channel signal which is not part of the desired on-channel signal, including but not limited to spurious responses, non-linearity distortion effects, and ambient noise signals.

The ADCs 114 and 144 sample their respective baseband analog input signal at a predefined sample rate as necessitated to meet the specific protocol requirements of the first and second received RF signal respectively. Each ADC 114 and 144 samples IF signal 109 and 139 respectively at a rate that meets or exceeds a minimum threshold as defined by Nyquist Sampling Criteria to preserve pertinent information within the sampled-received IF signal. Because the first and second RF received signals are independent and non-coherent with respect to each other, each ADC sample rate may be set independently of each other, and each ADC configuration (e.g., sample rate, noise characteristics, output format, etc) may be changed without consideration to the configuration of the companion ADC in receiver system 100.

Following the ADC section, each of the digitized sampled-received IF signals are subsequently processed by their respective post-ADC Decimate and Scaling block 116 and 146, where the sampled-IF signals may be enhanced by removing undesired digital distortion such as aliasing (in which undesired off-channel sampled signals may be mistaken for desired on-channel sampled signals). In the post-ADC Decimate and Scaling blocks 116 and 146, various digital sub-stages may be used to simultaneously process and format the digital signals independently for conveyance to subsequent digital sub-stages. Decimate and Scaling blocks 116 and 146 may each include at least one decimation block for changing an input sample rate to an output sample rate that is different from the input sample rate, at least one Finite Impulse Response (FIR) to minimize aliasing, Infinite Impulse Response (IIR) filters for DC offset error correction, and a formatting block that arranges the processed samples of the IQ analog signals into a predefined format.

The post-ADC sampled-IF signals from ADC 114 and 144 are also used as a signal source for AGC state machines 126 and 156 respectively. AGC state machine 126 adjust the gain of various gain stages distributed throughout a first receive sub-system of blocks 104, 106, 108, 110, 112, 114, 116, 118 and 120. For example, AGC state machine 126 processes the sampled-IF signals from ADC 114 to estimate the first received RF signal level, and thereby adjust the gain of LNA 106 through varying an AGC control signal to optimize the first received signal SNR. Similarly, AGC state machine 156 adjusts the gain of various gain stages distributed throughout a second receive sub-system, in parallel to the first receive sub-system, of blocks 134, 136, 138, 140, 142, 144, 146, 148 and 150. AGC state machine 156 processes the sampled-IF signals from ADC 144 to estimate the second received RF signal level, and thereby adjust the gain of LNA 136 by means of an AGC control signal to optimize the second received signal SNR. Both AGC state machines 126 and 156 function by comparing the levels of the first and second sampled receive signals to various predefined thresholds to determine how to appropriately adjust the LNA gain.

Accordingly there are two independent closed loop AGC systems in receiver system 100: the first AGC closed loop system contains LNA 106, ADC 114 and AGC state machine 126, while the second AGC closed loop system contains LNA 136, ADC 144 and AGC state machine 156. Each AGC system operates independent of, or in sequence with, the other AGC system or other receiver sub-systems of the receiver system 100.

Each AGC system may also include additional detectors desired to properly condition the appropriate received signal. Accordingly, the analog IF signal 109 and 139 are independently processed by off-channel detectors 124 and 154 respectively. The output signal from off-channel detector 124 and 154 are processed by AGC state machine 126 and 156 respectively, with changes in the receive system gain being accomplished by the appropriate control signal as previously described. Changes in gain settings from AGC state machines 126 and 156 occur independently and are proportional to changes in the first and second RF received signal levels respectively.

The digitized outputs from Decimate and Scaling blocks 116 and 146 are subsequently processed by Selectivity and Direct Current Offset Correction (DCOC) blocks 118 and 148 respectively. Selectivity and DCOC blocks 118 and 148 provide additional off-channel signal attenuation for the first and second received signal respectively, thereby protecting any desired on-channel signals from undesired spurious interference. Selectivity and DCOC blocks 118 and 148 also process their respective sampled-received IF signal to eliminate residual DC offset errors remaining in the desired on-channel signal.

The output signals from the Selectivity and DCOC blocks 118 and 148 are subsequently processed by the Synchronous Serial Interface (SSI) formatting blocks 120 and 150 respectively. The SSI formatting blocks 120 and 150 format the digitally sampled IF signal for conveyance of SSI signals 160 and 162 to DSP 170 via the SSI interface. The formatting criteria for SSI formatting blocks 120 and 150 are independent (and thus uncorrelated) from each other. DSP 170 is thus able to receive the independent SSI signals 160 and 162, one each for SSI formatting block 120 and 150.

DSP 170 directly or indirectly controls the radio processes for receiver system 100 and evaluates pertinent radio information, including the SSI information representing the first and second received RF signal, AGC information from the first and second AGC state machines, and first and second LO signal source operational status. The DSP 170 may be a single processor or a plurality of specialized processors arranged to perform system maintenance while providing proper radio operation for the user. In performing its functions, DSP 170 communicates with particular blocks in the receiver system 100 through Serial Port Interface (SPI) 172. The DSP 170 uses the SPI 172 to dynamically configure parallel receiver sub-system blocks for different operating frequencies, gain settings, BW setting, sample rates, or other parameters used to function in different protocols, RF environments, or coding strategies. In addition, DSP 170 may communicate to certain User Interface (UI) blocks (not shown) independent of SPI to ensure timely execution of critical functions.

Figure 2:
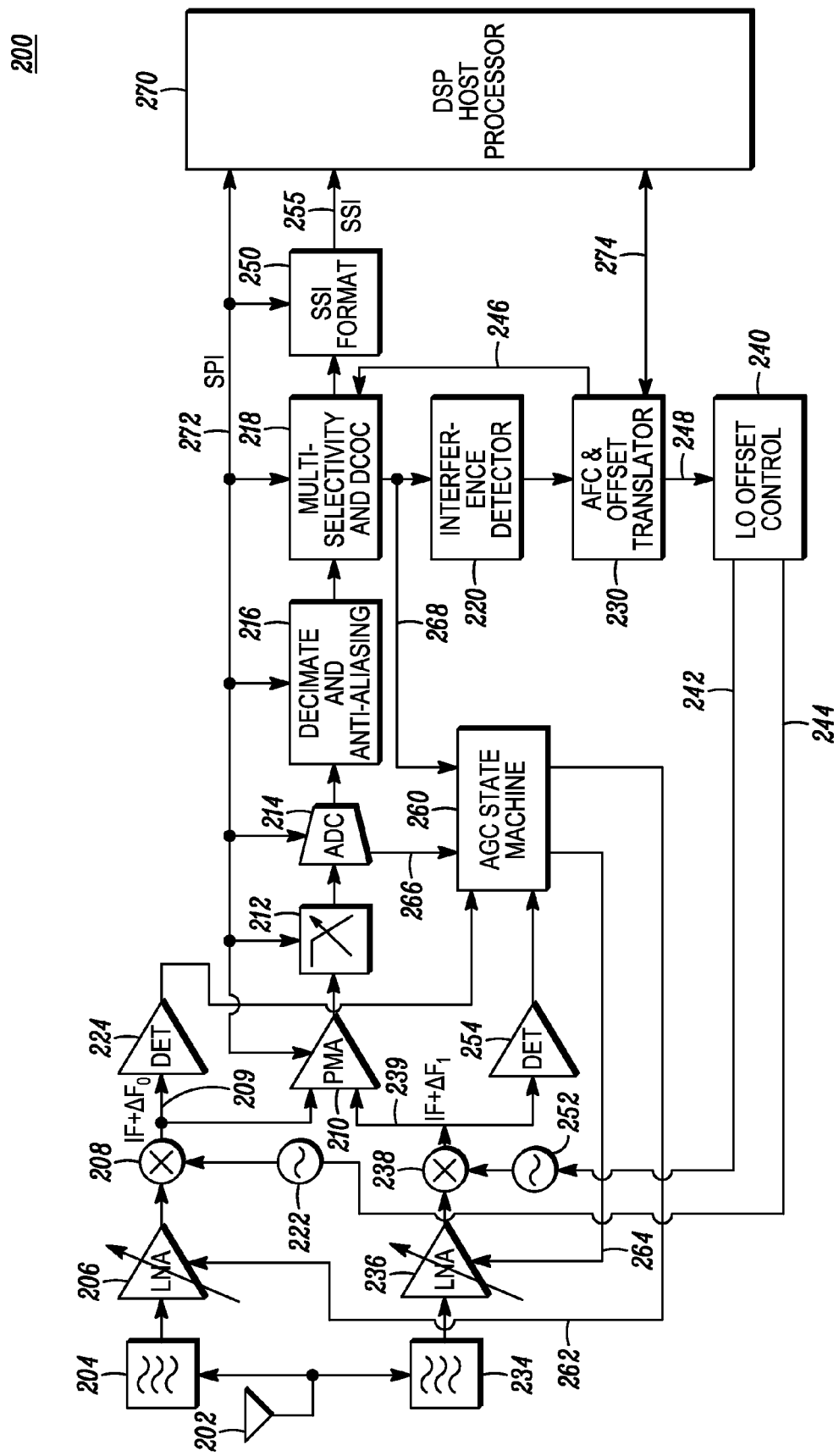
FIG. 2 depicts one embodiment of a block schematic diagram of a hybrid DCR receiver that is capable of receiving independent, non-coherent RF signals on independent channels.

FIG. 2 illustrates an embodiment for simultaneously receiving and monitoring independent RF signals. While the receiver system 200 is an H-DCR architecture, any receiver topology as is known in the art may be adapted to use a similar strategy and thereby incorporate the associated advantages. The receiver system 200 includes an antenna 202 for receiving a plurality of RF signals transmitted on the appropriate operational frequency range. Alternatively, receiver system 200 may also incorporate multiple antennas, one for each RF signal to be received, as illustrated in FIG. 1.

The received signals at antenna 202 include first and second desired RF signals that are received simultaneously and occupy different RF channels. The received signals from antenna 202 are filtered by preselectors 204 and 234, where preselector 204 filters the first desired RF signal and preselector 234 filters the second desired RF signal. Both preselector 204 and 234 attenuate RF signals located outside of the frequency range of interest. Typically, preselector 204 and 234 may utilize a BPF topology having a pass-band BW of 5 MHz to 100 MHz or greater. The receiver system 200 may include a plurality of preselectors having different topologies as is known in the art. The output signal from preselector 204 and 234 is processed by LNA 206 and 236 having an adjustable gain that respectively amplifies the first and second desired RF signal. The gain of LNA 206 and 236 is adjusted using AGC control signal 262 and 264 respectively, thereby facilitating control of the LNA gain by AGC state machine 260.

The output signal from LNA 206 and 236 is applied to mixer 208 and 238 respectively. The mixer 208 and 238 converts the received RF signal with an appropriate LO signal to generate an IF signal at the mixer output. Accordingly, mixer 208 down-converts the first RF signal to a first IF signal 209 containing baseband I and Q signals. The first IF signal 209 is offset from a reference IF by a first delta frequency ($\Delta_0$). Mixer 238 simultaneously down-converts the second received RF signal to a second IF signal 239 containing baseband I and Q signals. The second IF signal 239 is offset from the reference IF by a second delta frequency ($\Delta f_1$). In this manner, mixers 208 and 238 effectively translate RF signals spectrally residing in a particular RF channel to an IF sub-channel having the same pass-band BW, but spectrally offset from the IF sub-channel where the offset is related to a particular IF sub-channel. Sub-channels are described more fully in FIG. 4. The reference IF frequency at the output of mixer 208 and 238 may be equal; however, the first and second offset frequencies $\Delta f_0$ and $\Delta f_1$ from mixers 208 and 238 respectively are not equal as the desired signal from the outputs of the mixers 208 and 238 are to spectrally reside in different IF sub-channels. Only one of the quadrature signal paths is shown in FIG. 2 at the output of mixer 208 and 238 for convenience.

LO signals are provided to mixers 208 and 238 from LO sources 222 and 252 respectively. LO sources 222 and 252 may include a FGU, one or more VCOs, and at least one reference oscillator to form independent closed loop PLL systems as is well known in the art. LO sources 222 and 252 are independently configurable by SPI 272 by which DSP host processor 270 (also referred to as DSP 270) controls changes in the operating frequency of the LO signal to mixers 208 and 238. As SPI 272 is bi-directional, DSP 270 may also receive information from SPI 272. Complementary to other controlling means, both LO sources 222 and 252 are adjusted independently by LO offset control signals 242 and 244 from LO Offset Control 240. LO Offset Control 240 configures the LO sources 222 and 252 to produce the LO offset to induce the correct IF offset $\Delta f_0$ and $\Delta f_1$ the appropriate mixer output. LO Offset Control 240 also regulates the AFC sequencing to minimize undesired frequency errors (e.g., netting errors) that may exist between the actual LO frequency and the targeted ideal LO frequency.

Thus, the H-DCR topology shown in FIG. 2 contains two front end branches: the first branch contains preselector 204, LNA 206, and mixer 208 and is associated with LO source 222 while the second branch contains preselector 234, LNA 236, and mixer 238 and is associated with LO source 252. The first and second branches operate independently of each other, and simultaneously receive the first and second desired RF signal. Although only two branches are shown, any number of front end branches may be incorporated in the H-DCR topology as may be desired, with each branch operating independently while simultaneously processing its respective received RF signal using its own dedicated mixer.

The complex paired IQ signals at the output of mixer 208 and 238 contain the IF signals 209 and 239 respectively. IF signal 209 and 239 are subsequently spectrally combined and amplified at PMA 210. PMA 210 maximizes the SNR of the combined IF signal and preserves the desired information in IF signals 209 and 239. The PMA gain is adjusted by the DSP 270 through SPI 272 or by other means as may be known in the art. Each mixer output signal is BW limited about a common IF frequency, with each mixer's IF signal having unique IQ spectral offset $\Delta f_0$ and $\Delta f_1$ so as to occupy a different sub-channel. The IF signals produced within an H-DCR configuration having multiple front end branches are spectrally combined and amplified at PMA 210.

The output signal from PMA 210 contains information from both IF signals 209 and 239. The output signal from PMA 210 is subsequently processed by an analog processing block 212. Analog processing block 212 incorporates a series of cascaded gain and filter stages that increase the SNR of the desired on-channel information while attenuating undesired off-channel interference signals spectrally located outside the BW of the analog processing block 212. Because the PMA output signal is combination of both IF signals 209 and 239, any processing of the IF signal by analog processing block 212 effectively processes both the IF signals 209 and 239 simultaneously. Accordingly, the Analog Processor IF (APIF) BW setting for the analog processing block 212 is wide enough to prevent loss of information in the desired IF signals that are offset from the reference IF by $\Delta f_0$ and $\Delta f_1$ for signals 209 and 239 respectively.

After processing the combined IF signal through the analog processing block 212, the signal is digitized by an ADC 214. Because the signal being sampled by ADC 214 is a composite signal containing both the first and second IF signals 209 and 239, the ADC 214 is effectively digitizing both the first and second IF signals simultaneously and synchronously. Therefore, the sample rate for ADC 214 is set to be sufficiently high to preserve the desired signal fidelity of each of the first and second IF signals 209 and 239. Generally, the ADC sample rate is set to exceed a rate twice the analog BW setting of the analog processing block 212 so as to meet Nyquist Sampling Criterion for preserving the spectral integrity of the entire analog pass band response for analog processing block 212. Additional consideration may be given to scaling the ADC 214 to meet specific protocol requirements for IF signals 209 and 239; however, at a minimum the ADC sample rate is set to twice the highest IF offset frequency (i.e., the larger of $\Delta f_0$ and $\Delta f_1$). The output signal from ADC 214 is a sub-channel agnostic, sampled IF signal that does not incorporate spectrally specific, channelized selectivity.

The combined sampled-received IF signals are then processed by a post-ADC Decimate and Anti-Aliasing block 216 where the ADC output sample rate is decimated to a different sample rate with appropriate filtering to remove undesired digital distortion such as aliasing. In the Decimate and Anti-Aliasing block 216, various digital sub-stages may be used to process and format the digital signals and then applied to subsequent digital sub-stages. Decimate and Anti-Aliasing block 216 may include at least one decimation block for changing a first input sample rate to a second output sample rate, at least one Finite Impulse Response (FIR) to minimize aliasing, Infinite Impulse Response (IIR) filters for DC offset error correction, and a formatting block that arranges the processed samples of the IQ analog signals into a predefined format.

The digitized output from Decimate and Anti-Aliasing block 216 is subsequently processed by multi-channel selectivity (MS)-DCOC block 218. The multi-channel selectivity function of MS-DCOC block 218 provides a plurality of sub-channel specific selectivity responses that are matched to the particular sub-channel offsets $\Delta f_0$ and $\Delta f_1$. The multi-channel selectivity function may be efficiently realized using parallel complex Finite Impulse Response (FIR) filters, although other realizations are possible. The composite response for MS-DCOC block 218 targets minimum attenuation for pass-band regions centered about the appropriate IF offsets $\Delta f_0$ and $\Delta f_1$ while attenuating signals spectrally falling outside of the active sub-channel pass-band. Therefore, the IF offsets $\Delta f_0$ and $\Delta f_1$ embedded respectively in IF signal 209 and 239 set the active IF sub-channel and accordingly dictate the spectral selectivity responses realized by MS-DCOC block 218.

The selectivity responses for MS-DCOC block 218 can be dynamically adjusted by changing the coefficients of the FIR filters incorporated into MS-DCOC block 218. The active sub-channel designation, or sub-channel index, is communicated to MS-DCOC block 218 through signal 246 from AFC and Offset Translator 230, whereupon the appropriate filter coefficients are selected so as to realize the desired selectivity responses. The FIR filter coefficients may be retrieved from memory (not shown) containing a tabularized coefficient archive defining possible sub-channel selectivity responses. Alternatively, the FIR filter coefficients may be programmed into MS-DCOC block 218 directly from the DSP 270 by SPI 272. In this manner, MS-DCOC block 218 translates the sub-channel agnostic, sampled IF output from ADC 214 into a channelized sampled IF signal ostensibly containing only the desired information signals from IF 209 and 239, while attenuating off-channel signals that might otherwise cause undesired spurious interference.

After being filtered by the multi-channel selectivity FIR filters within MS-DCOC block 218, the channelized sampled IF signals are DC compensated using secondary DCOC strategies to further minimize remaining residual DC offset errors in a particular sub-channel's spectral range. Not all sub-channels may employ DCOC precision; therefore, the method of DCOC compensation may vary depending on the specifics of the active sub-channel, the modulation type occupying a particular sub-channel, and the accuracy of the DCOC compensation desired. Accordingly, the DCOC strategy in MS-DCOC block 218 may include a plurality of DCOC techniques as appropriate for a particular sub-channel. Taken together, selectivity and DCOC blocks 118 and 148 of FIG. 1 may comprise portions of the MS-DCOC block 218 of FIG. 2.

The output of MS-DCOC block 218 is a complex paired IQ, channelized sampled IF signal representing the on-channel received signals from multiple RF channels that are subsequently parallel processed by a plurality of blocks, including SSI formatting block 250, AGC state machine 260 and interference detector 220. SSI formatting block 250 formats the complex IQ sampled IF signals for DSP 270 processing via the SSI interface 255. The SSI formatting parameters include, but may not be limited to: SSI clock rate, number of bits per sample, and number of data fields embedded in the SSI word. These SSI parameters may vary to ensure relevant information is preserved while supporting a diverse range of protocols. A plurality of SSI data fields may be processed by SSI formatting blocks 250 to DSP 270, including but not limited to: the complex IQ sampled IF signals, AGC status for LNA 206 and 236, status of LO Offset Control 240, and status of the DCOC compensation value from Decimate and Anti-Aliasing block 216 and MS-DCOC block 218. The SSI formatting block 250 is dynamically configured by the DSP 270 using the SPI 272.

AGC state machine 260 adjusts the gain of various gain stages distributed throughout receiver system 200. Accordingly, AGC state machine 260 estimates a received RF signal level, and thereby adjusts a given gain stage so as to optimize the SNR of the desired received signals. AGC state machine 260 processes signals from a plurality of sources, including a sub-channel agnostic sampled IF signal 266 from ADC 214, channelized sampled IF signal 268 from MS-DCOC block and broadband off-channel signals from detectors 224 and 254. AGC state machine 260 correlates the various input signals to predefined thresholds to determine how to appropriately change a particular LNA gain. By appropriately processing the various input signals, AGC state machine 260 determines what the optimum gain setting is for a given front end branch, and adjusts the AGC control signals 262 and 264 accordingly. In this manner, two concentrically nested, closed loop AGC systems are evident in receiver system 200 whereby AGC state machine 260 adjusts AGC control signals 262 and 264 independently and thereby independently adjusts the gain setting of LNA 206 and 236 respectively. The first AGC loop incorporates LNA 206, PMA 210, detector 224, ADC 214, MS-DCOC BLOCK 218, AGC state machine 260 and AGC control signal 262 to form a closed loop system that autonomously controls the gain of LNA 206 so as to optimize the SNR of a first desired received signal. The second AGC loop incorporates LNA 236, PMA 210, detector 254, ADC 214, MS-DCOC BLOCK 218, AGC state machine 260 and AGC control signal 264 to form a closed loop system that autonomously controls the gain of LNA 236 so as to optimize the SNR of a second desired received signal.

In other embodiments, receiver system 200 may include multiple AGC state machines, each AGC state machine being individually dedicated to controlling a specific front end branch so as to simultaneously process a desired received signal. It is apparent to those skilled in the art that incorporating a plurality of such channel specific AGC state machines is similar to using a single state machine controlling a plurality of front end branches as shown in FIG. 2, and therefore accomplishes the same functionality described with relation to the embodiment shown in FIG. 2.

Input signals into AGC state machine 260 as shown include a sub-channel agnostic sampled IF signal 266, channelized sampled IF signal 268, and other output signals from detectors 224 and 254. The sub-channel agnostic sampled IF signal 266 is produced by ADC 214 and contains a complex IQ representation of the wide-band spectral signal containing both IF signals 209 and 239. No sub-channel specific selectivity is included in sub-channel agnostic sampled IF signal 266. The channelized sampled IF signal 268 is produced from MS-DCOC block 218 and contains the complex IQ representation of the paired, sub-channel specific IF signals 209 and 239 after each has been processed by an appropriate selectivity filter. Therefore, channelized sampled IF signal 268 incorporates a pair of channel specific selectivity responses that attenuate undesired signals falling outside of active IF sub-channels associated with IF signals 209 and 239 respectively.

Detectors 224 and 254 are designated as "off-channel" detectors and detect interferers spectrally co-located approximate with the first and second desired received signal respectively. While FIG. 2 shows detectors 224 and 254 operating on output signals from mixers 208 and 238 respectively; each detector 224 and 254 also processes output signals from any given block associated with its particular front end branch. Accordingly, detector 224 operates on the output signals from preselector 204 or LNA 206 or mixer 208, while detector 254 operates on the output signal from preselector 234 or LNA 236 or mixer 238. In one embodiment, the BW of the spectrum represented by the output signals from detectors 254 and 224 ranges from 5 MHZ to 50 MHz, the BW for the channel agnostic sampled IF signal 266 ranges from 100 kHz to 5 MHz, and the BW of each sub-channel incorporated into the channelized sampled IF signal 268 ranges from 6.25 khz to 50 kHz. A relationship may exist between these BW ranges. For example, the sub-channel BW for signal 268 may be proportionally scaled to the wide-band BW of signal 266, and the wide-band BW for signal 266 may be proportionally scaled to the broad-band BW of the output signals from detector 224 and 254.

Interference detector 220 processes the channelized sampled IF signal 268 from MS-DCOC block 218 to determine if there is an undesired co-channel interferer present in any of the active sub-channels of receiver system 200. The interference detector 220 may employ any number of methodologies to determine the presence of a co-channel interferer, depending on the reception status of the receiver, specifics of the protocol indigenous to the desired received signals, modulation of the desired received signal, and demodulated signal fidelity. Interference metrics used by the interference detector 220 may include, but are not limited to: IF sub-channel specific SOS Envelope Energy Estimates (EEE), Signal Quality Estimate (SQE), Signal-to-Noise Ratio (SNR) threshold, Error Vector Magnitude (EVM) and/or Bit Error Rate (BER) threshold, or other protocol specific methods of acknowledgment-retransmission schemes used to deal with collisions between multiple independent received signal occupying the same channel.

By way of example, when an on-channel RF signal is not being received at a given front end branch of receiver system 200, the interference detector 220 may employ an SOS EEE proportional to $I^2+Q^2$ of the complex IQ signal from the associated sub-channel to determine the presence of any on-channel received signals. If the EEE for a given IF sub-channel is below a predefined threshold, the interference detector 220 designates that RF channel as signal free, thereby allowing receiver system 200 to continue to monitor RF channel for a signal. If the EEE exceeds the predefined threshold, the Interference Detector 220 may correlate secondary metrics such as SQE or EVM to determine if the received RF signal is an interferer or a desired received signal. The demodulated SQE or other figure of merit indices may be internally generated by interference detector 220 or provided by DSP 270 over SPI 272. If the SQE or EVM metric indicates a minimally degraded desired received signal, interference detector 220 designates the associated IF sub-channel as active interference free, thereby allowing the receiver system 200 to continue to process the desired received RF signal. However, if the SQE or EVM is indicative of an unacceptably degraded received RF signal or a pure interferer, then interference detector 220 designates the associated sub-channel as corrupted. Subsequent to detecting an interferer, interference detector 220 signals AFC and Offset Translator 230 to select a new IF sub-channel to replace the current active IF sub-channel.

AFC and Offset Translator 230 regulates the interference mitigation processes by adjusting the LO source associated with the front end branch receiving the interference. AFC and Offset Translator 230 accomplishes this by tracking the active interference-free sub-channels, translating specific sub-channels within the pass-band of the analog processing block 212 to specific IF offsets $\Delta f_0$ and $\Delta f_1$ and associating the IF offset $\Delta f_0$ and $\Delta f_1$ to specific LO sources 222 and 252, each LO source 222 and 252 being associated with a specific front end branch containing a specific mixer 208 and 238 respectively. During initialization of receiver system 200, DSP 270 instructs AFC and Offset Translator 230 to tabularize possible sub-channels for a given pass-band BW of analog processing block 212. Once possible sub-channels are known, AFC and Offset Translator 230 associates each sub-channel "k" with a unique IF offset $\Delta f_k$ to spectrally occupy sub-channel k. Each offset $\Delta f_k$ in turn dictates specific LO offsets to spectrally occupy that sub-channel. AFC and Offset Translator 230 then "activates" a sub-channel by affiliating a particular sub-channel's IF offset $\Delta f_k$ to a specific LO source, thereby assigning the sub-channel to a particular front end branch, which in turn is to receive a specified desired receive signal. When interference is detected on sub-channel k, AFC and Offset Translator 230 records sub-channel k as "degraded" in the tabularized sub-channel ranking, and proceeds to select a new IF sub-channel "n" from the tabularized sub-channel listing, the new sub-channel having a new interference-free IF offset $\Delta f_n$.

By designating a sub-channel as degraded, AFC and Offset Translator 230 de-prioritizes the particular sub-channel within the sub-channel listing so that it is not as frequently checked as a candidate for sub-channel activation by receiver system 200. Each sub-channel may be given a priority rating having a numeric value ranging from e.g., a maximum of 10 to a minimum of 1. A sub-channel having a priority rating of 10 is deemed substantially interference-free, and sub-channels having the highest priority rating are given preference for being enabled for active receive. All sub-channels are initially prioritized to 10, and are deprioritized only when interference is actually detected. Once a sub-channel has been deemed interference free and activated, it remains active and affiliated with a desired received signal until interference is detected, whereupon a replacement sub-channel is selected using a Tabularized Sub-Channel Listing (TSCL described in more detail with reference to FIG. 7) search sequence.

The TSCL search sequence is performed by the AFC and Offset Translator 230, and consists of each sub-channel in the TSCL being checked for interference, starting from the current sub-channel, proceeding in index sequence to the last TSCL indexed sub-channel, before resuming at the first TSCL index. If interference is detected on a sub-channel, the priority rating for that sub-channel is reduced by 1 and the TSCL search sequence proceeds to the next sub-channel in the TSCL if a higher priority sub-channel is extant. When a deprioritized sub-channel is rechecked and found to be interference free, the priority rating for that sub-channel is increased by 1 or more, and that sub-channel may be enabled for active receive operation.

As part of the TSCL search sequence, deprioritized sub-channels may be skipped (i.e., not checked for interference) during a search iteration, so as to check higher prioritized sub-channels (i.e., ones having less interference) more frequently. The number of times a sub-channel is skipped may be scaled to its priority rating, such that a priority rating of 9 is skipped less frequently than a sub-channel having a priority of 3. For example, a sub-channel may be skipped based on the difference of 10-(current priority rating) before it is rescheduled to be check for interference; therefore a sub-channel having a priority rating of 9, 5, or 3 is skipped 1, 5 or 7 times respectively before it is rechecked for interference A sub-channel may be substantially interference-free or have the highest priority rating contained in the TSCL at the end of a complete TSCL search sequence before being activated.

By way of example, assuming a sub-channel having constant interference is first checked at priority 10 then deprioritized to 9, skipped once, rechecked at priority 9 then deprioritized to 8, skipped twice, rechecked at priority 8 then deprioritized to 7, skipped three times before being rechecked at priority 7, at which time the interference is gone and the sub-channel may be activated. For this example, 10 iterations through all indices of the TSCL search sequence would be completed before that sub-channel is found to be interference free. After being found to be substantially interference-free, the priority of that sub-channel may then be increased from 7 to 8 or 9 depending on past interference performance. This would allow that sub-channel to be re-checked more frequently now that it has been found to be interference-free.

As previously described, the AFC and Offset Translator 230 regulates which sub-channels are active and which sub-channel is associated with a specific front end branch. The active sub-channels indices are communicated to the MS-DCOC block 218 from AFC and Offset Translator 230 by signal 246. The active sub-channel status and degraded sub-channel metrics are communicated to DSP 270 through sub-channel information signal 274. After the receiving the active sub-channels indices, MS-DCOC block 218 generates the appropriate filter coefficients to realize the appropriate sub-channel specific selectivity responses. Concurrent with communicating a change in the active sub-channel indices to the MS-DCOC block 218, AFC and Offset Translator 230 communicates the new LO offset information to LO offset control 240 through translation signal 248. LO offset control subsequently adjusts the appropriate LO offset control signal 242 and 244 to change the specified LO source 222 and 252 and thereby realize the correct IF offsets $\Delta f_0$ and $\Delta f_1$ respectively at the appropriate mixer output.

During receive operations unencumbered by interference, the AFC and Offset Translator 230 also functions as an AFC state machine. In this role, AFC and Offset Translator 230 continuously monitors (e.g. checked every 2-5 mS or less depending on protocol requirements) the residual offset errors (also known as frequency netting errors) for each active IF sub-channel. A netting error is defined as the difference in frequency between the targeted IF offset $\Delta f_k$ and the true IF offset as measured in the channelized sampled IF output signal from MS-DCOC block 218. If the netting error for a given IF sub-channel exceeds a predefined threshold, the AFC and Offset Translator 230 communicates to LO Offset control 240 germane information, identifying the LO source to be adjusted, and the magnitude of the frequency adjustment to minimize the netting error. This AFC operation is performed in real time on active receive RF channels (e.g., active IF sub-channels), thereby the AFC and Offset Translator 230 monitors multiple IF sub-channels at the same time.

It is therefore apparent that there are two concentrically nested, closed loop AFC systems incorporated into receiver system 200 whereby AFC and Offset Translator 230 regulate LO offset control signals 242 and 244 to adjust LO sources 222 and 252 respectively. The first AFC loop incorporates LO source 222, mixer 208, PMA 210, ADC 214, MS-DCOC BLOCK 218, AFC and Offset Translator 230, LO offset control 240 and LO offset control signal 244 to form a closed loop system that autonomously controls the frequency of LO source 222. The second AFC loop incorporates LO source 252, mixer 232, PMA 210, ADC 214, MS-DCOC BLOCK 218, AFC and Offset Translator 230, LO offset control 240 and LO offset control signal 242 to form a closed loop system that autonomously controls the frequency of LO source 252. In a like manner, the function of AFC and Offset Translator 230 may be expanded to control a plurality of LO sources, with the adjustment in each LO source being accomplished either independently of, or synchronous with, other LO sources.

Alternatively, receiver system 200 may include multiple AFC controllers similar in function to AFC and Offset Translator 230, with a single AFC controller dedicated to a single active IF sub-channel to simultaneously process a plurality of received signals. It is apparent to those skilled in the art that incorporating a plurality of channel specific AFC controllers, with each one controlling a single IF sub-channel, is similar to utilizing a single AFC and Offset Translator 230 controlling a plurality of IF sub-channels as shown in FIG. 2, and thus accomplishes the same functionality as the embodiment shown in FIG. 2.

The DSP 270 directly or indirectly controls various radio processes and evaluates pertinent radio information, including the channelized sampled IF signal contained in SSI signal 255, sub-channel information signal 274 and other block information as may be communicated to the DSP 270 via SPI 272. The DSP 270 may be a single processor or a plurality of specialized processors arranged to perform system maintenance while providing proper radio operation for the user. In performing its functions, DSP 270 communicates with blocks in receiver system 200 through SPI 272. The DSP 270 uses SPI 272 to dynamically configure various blocks in receiver system 200 as may be desired to facilitate simultaneous reception of independent, desired RF signals from different RF channels that use different protocols and modulation strategies. Accordingly, DSP 270 configures various blocks in receiver system 200 to different operating frequencies, gain settings, BW setting, sample rates, or other parameters. In addition, DSP 270 interrogates blocks within receiver system 200 to ascertain the current configuration and operational status of a given block. DSP 270 may query a given block using SPI 272, or may use a dedicated signal line such as that used for sub-channel information signal 274, whereby the DSP 270 may communicate to a dedicated block such as AFC and Offset Translator 230.

In the embodiment shown by FIG. 2, the DSP 270 operates separate from and independent of the various post-ADC 214 digital blocks illustrated. However, any or all of the post-ADC digital block functions in FIG. 2 can be incorporated into the DSP 270 in other embodiments. By implementing standalone, task-specific, post-ADC digital blocks in receiver system 200, increased processing efficiency is able to be realized at a smaller current drain than can be achieved when compared to the increased mega-instructions-per-second (MIPS) and programming complexity required by a generic host processor block to perform equivalent functions.

Figure 3:
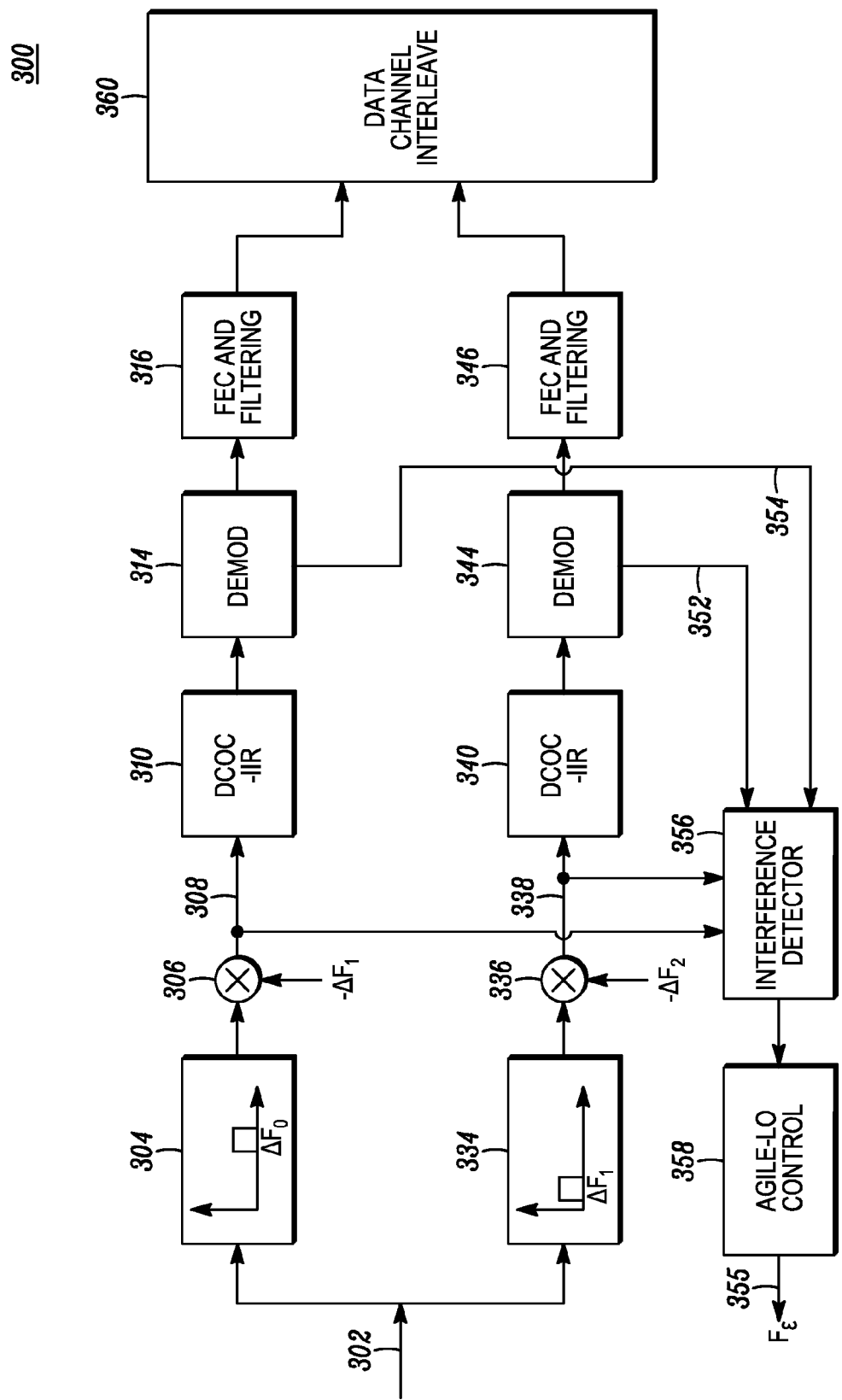
FIG. 3 depicts one embodiment of a block schematic diagram illustrating the digital signal processing flow of a single sampled receive data sequence representing independent, non-coherent RF signals.

FIG. 3 is a block diagram illustrating system 300 which details the digital tasks to effectively process the simultaneously received signals by receiver system 200 of FIG. 2. System 300 begins by receiving sub-channel agnostic sampled IF signal 302. Signal 302 of FIG. 3 corresponds to the output signal of Decimate and anti-aliasing block 216 of FIG. 2. Sub-channel agnostic sampled IF signal 302 is subsequently processed in tandem by parallel filters 304 and 334. The selectivity response of each filter 304 and 334 is respectively spectrally centered about a unique offset from a reference IF by $\Delta f_0$ and $\Delta f_1$. IF offsets $\Delta f_0$ and $\Delta f_1$ of filter 304 and 334 respectively correspond to $\Delta f_0$ and $\Delta f_1$ of IF signals 209 and 239 of FIG. 2. As described in MS-DCOC block 218 of FIG. 2, IF offsets $\Delta f_0$ and $\Delta f_1$ define the specific center frequency for a particular active IF sub-channel; therefore, $\Delta f_0$ and $\Delta f_1$ are sufficiently separated so as to ensure that the pass-band of the sub-channels do not overlap.

The output signal from filters 304 and 334 are subsequently processed respectively by re-sampling blocks 306 and 336. Re-sampling blocks 306 and 336 increment or decrement the channel specific, sampled IF signal to rescale the sample rate to minimize aliasing distortion and ensure efficient post-processing. Typically, a filter and re-sampling block pair 304-306 and 334-336 may each be realized by appropriately designing a FIR filter with embedded decimation. The output signals from re-sampling blocks 306 and 336 are complex paired, channelized sampled IF signals 308 and 338 respectively. Complex paired, channelized sampled IF signals 308 and 338 are subsequently parallel processed by Interference detector 356 and DCOC blocks 310 and 340. The combination of blocks 304, 306 and 310 form a first sub-channel specific digital processing section used to extract a first desired received signal from a specific IF sub-channel. Additionally, the combination of blocks 334, 336 and 340 form a second sub-channel specific digital processing section used to extract a second desired received signal from a different IF sub-channel. Taken together, the combinations of blocks 304, 306, 310, 334, 336 and 340 comprise MS-DCOC block 218 of FIG. 2. Interference detector 356 of FIG. 3 corresponds to Interference detector 220 of FIG. 2.

DCOC blocks 310 and 340 remove undesired DC offset errors that may be included in the channelized sampled IF signals. The DCOC methodology initiated by DCOC block 310 and 340 is tailored to the spectral position of the IF sub-channel and modulation characteristic of the desired on-channel received signal. If the desired on-channel signal is modulated with an appropriate digital sequence, modulated information is contained in the phase and amplitude characteristic of the received signal, thereby precluding modulated information from being exactly at DC. For this type of digitally modulated received signal, the DCOC methodology may be an IIR High Pass Filter (HPF) iterating sample-by-sample to remove the DC offset errors in real time. However, if the received signal is modulated with an analog signal, and the IF sub-channel assignment includes the DC component as part of the valid spectral domain, the DCOC methodology is modified to a block-by-block computationally-based algorithm to not remove the desired modulated information resident at DC. Accordingly, the DCOC strategy in DCOC block 310 and 340 may include different DCOC techniques as appropriate for a particular IF sub-channel and modulation type.

The DC compensated signals from DCOC blocks 310 and 340 are subsequently processed by demodulators 314 and 344 followed by Forward Error Correction (FEC) and filtering blocks 316 and 346, which thereby complete the process of recovering the desired information from the received signals. Demodulators 314 and 344, and FEC and filtering blocks 316 and 346 may be uniquely customized to properly process their respective desired received signals in parallel, but independently and asynchronously. The demodulator 314 and FEC and filtering block 316 may thus be configured completely different from demodulator 344 and FEC and filtering block 346, with demodulator 314 and FEC and filtering block 316 processing a first IF sub-channel signal using a first sample rate, clock speed and algorithm to demodulate a first desired received signal. Similarly, demodulator 344 and FEC and filtering block 346 may be configured completely different from demodulator 314 and FEC and filtering block 316, with demodulator 344 and FEC and filtering block 346 processing a second IF sub-channel signal using a second sample rate, clock speed and algorithm to demodulate a second desired received signal.

FEC and filtering blocks 316 and 346 produce a first and second received information signal respectively, with the received information signals being recovered from their respective channelized sampled IF signals. These received information signals are multiplexed into a common data format for transmission to subsequent processing blocks. The multiplexing of multiple information signals is accomplished at data-channel interleave block 360. The recovered information signals are sample aligned and interleaved together using a predetermined time format to preserve the integrity of each information signal while efficiently conveying both signals to other digital stages for further processing.

System 300 incorporates two digital processing branches that can parallel process two independent, uncorrelated sampled received signals in tandem. The first protocol specific, digital processing branch contains filter 304, re-sampling block 306, DCOC block 310, demodulator 314 and FEC and filtering block 316. A second protocol specific, digital processing branch contains filter 334, re-sampling block 336, DCOC block 340, demodulator 344 and FEC and filtering block 346. Each protocol specific processing branch is dedicated to a specific active receive channel that is governed by different protocols, with the desired modulated information contained in the two desired received signals being independent of, and uncorrelated with, each other.

Interference detector 356 of system 300 processes the channelized sampled IF signals 308 and 338, in conjunction with demodulated signals 352 and 354. The interference detector determines if there is an undesired co-channel interferer present in the active sub-channels within signal 302. The interference detector 356 may employ a plurality of different methodologies to detect the presence of a co-channel interferer, depending on the reception status of the receiver, the specifics of the protocol indigenous to the desired received signals, the modulation of the desired received signal, and the demodulated signal fidelity. Interference metrics are generated by correlating multiple signals from varying stages along system 300. For example, interference detector 356 parallel processes sub-channel specific signal 308 and the demodulated signal 354 corresponding to the same sub-channel, correlating both the demodulated signal quality and received signal level to estimate the presence of an interference condition for the associated IF sub-channel.

In tandem with processing paired signals 308 and 354, interference detector 356 simultaneously processes signal 338 and demodulated signal 352 corresponding to a second sub-channel, correlating a second demodulated signal quality and second received signal level to estimate the presence of an interference condition for the second IF sub-channel. If interference detector 356 determines that a desired received signal is being degraded by interference, interference detector 356 designates which sub-channel is being degraded and triggers the agile LO control 358 to select an different IF sub-channel from a tabularized listing of available, interference free, sub-channels. The possible interference metrics employed by interference detector 356, may be found by referring to the description of interference detector 220.

Agile LO control 358 of FIG. 3 incorporates the functionality of both AFC and Offset Translator 230 and LO offset control 240 of FIG. 2. Accordingly, agile LO control 358 processes signaling from interference detector 356 to activate a new IF sub-channel when desired. Agile LO control 358 maintains the tabularized listing of possible IF sub-channels, tracks which IF sub-channels are currently active, and updates the tabularized listing to track those sub-channels that have been designed as "degraded" by interference. Agile LO control 358 also generates the LO control signal 355 used to steer the LO sources to the appropriate frequency of operation. LO control signal 355 of FIG. 3 includes LO offset control signals 242 and 244 of FIG. 2, and is connected to the various LO sources (not shown) in the H-DCR receiver.

System 300 can be realized in part or in whole through appropriate, task-specific digital state machines as may be known in the art, including but not limited to: a Field Programmable Gate Array (FPGA), Complex Programmable Logic Device (CPLD), or other hardware centric digital designs. In addition, portions of system 300 can be algorithmically incorporated into a DSP or host processor as may be expedient in achieving overall system requirements such as processing speed, power consumption and size. Such software-hardware centric partitioning can be implemented as dictated by particular system requirements.

Figure 4:
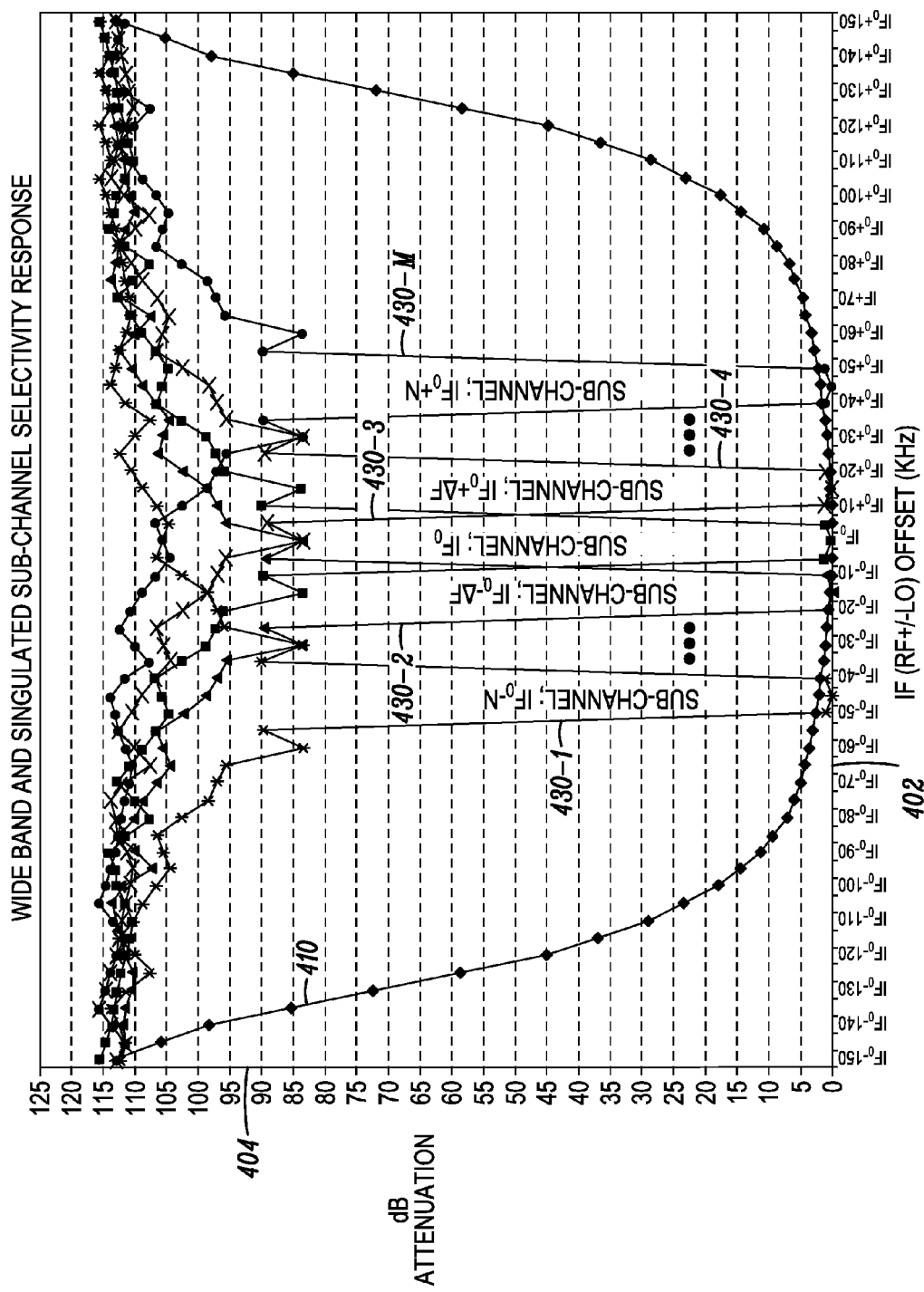
FIG. 4 depicts a graphical illustration of the hybrid DCR selectivity responses, including the wide band APIF selectivity and an associated non-offset portioning of the APIF response into its constituent sub-channel selectivity responses with their respective offset relationships in the frequency domain.

FIG. 4 illustrates selectivity responses in plot 400. The selectivity responses are associated with various filter stages incorporated into receiver system 200. The selectivity responses in plot 400 illustrate a non-offset partition strategy for the Analog Processing IF (APIF) BW and are plotted on a Cartesian coordinated system where the X and Y axis are designated as 402 and 404 respectively. The X-axis 402 is coordinate to the frequency offset from a reference IF frequency as measured at a mixer output, where the mixer is incorporated into a specific front end branch which is receiving the desired RF signal as described in FIG. 2. The IF frequency is proportional to the frequency difference between a desired received signal and a reference LO frequency in kHz. While the IF frequency can assume any arbitrary value, for the H-DCR embodiment of FIG. 4, the reference $IF_0$ is 0 Hz (or DC) and is realized when the desired carrier signal is approximately equal to the LO frequency. The Y-axis 404 is coordinate to the decibels (dB) of attenuation realized as a function of frequency offset, where 0 dB denotes minimum attenuation and a higher dB number indicates a higher level of attenuation. Response 410 exemplifies the wide-band APIF BW of analog processing block 212 for FIG. 2, centered at the reference frequency $IF_0$. From FIG. 4, it is evident that the pass band BW of baseband analog selectivity 410 is significantly wider than an individual sub-channel BW included in sub-channel group 430, and may span from +60 kHz to −60 kHz, for a total 3 dB BW of 120 kHz. In other words, the BW of analog processing block 212 is a channel that is occupied by a plurality of sub-channels (which are greater in number than the number of mixers or front end stages for at least the reasons described herein). However, the baseband analog selectivity 410 may be any selected span (e.g., 500 kHz or more) to accommodate the desired number of sub-channels for simultaneous receive operations.

In addition to baseband analog selectivity 410, plot 400 illustrates a family of responses (sub-channel group 430) containing a plurality of M sub-channels, where each sub-channel response is designated as 430-1, 430-2, 430-3 to 430-M. As illustrated in FIG. 4, each sub-channel has a uniform BW and is offset from other sub-channel responses by an integer multiple of offset frequency $\Delta F$, where $\Delta F$ is large enough to ensure that the pass band of one sub-channel is not co-located with the pass band of an adjacent sub-channel (i.e., adjacent sub-channels are non-overlapping). In other embodiments, the sub-channels may have different bandwidths and different sized offsets. The sub-channels are symmetrically distributed about the reference frequency $IF_0$, with a single sub-channel 430-3 being centered at $IF_0$. The sub-channel group 430 partitions the baseband analog selectivity 410 into a plurality of M contiguous sub-channels, each sub-channel being uniquely defined at frequency $IF_0 \pm N \times \Delta F$, where integer N ranges from 0, ±1, ±2, ±3 ... ±N. For the sub-channel partitioning illustrated in FIG. 4, the number of sub-channels M comprising sub-channel group 430 is defined as M=2×N+1. Each sub-channel in group 430 may be distinguished from other sub-channels by its unique offset of $IF_0 \pm N \times \Delta F$, where multiplier N may serve as the signed, sub-channel index used to track the sub-channel telemetry as described for AFC and Offset Translator 230 of FIG. 2. Therefore, the IF offsets illustrated in FIG. 4 are related to the offsets incorporated into signals 209 (IF+$\Delta f_0$) and 239 (IF+$\Delta f_1$) at the output of mixers 208 and 238 respectively, in H-DCR receiver 200 of FIG. 2.

The offset frequency $\Delta F$ between any given pair of sub-channels may vary between contiguous sub-channels within sub-channel group 430 dependent on the pass band BW of each sub-channel. For FIG. 4, the sub-channel pass-band BW may be scaled to the particular channel requirements for the received signal utilizing a given sub-channel. Accordingly, when receiving multiple simultaneous desired signals having different channel spacing, the pass band of the sub-channel may be tailored to the particular received signal assigned to that sub-channel index. Thus, if a particular sub-channel(s) uses a different pass band BW as dictated by a particular desired received signal protocol, then the corresponding offset for that sub-channel relative to the adjacent sub-channels is adjusted to prevent overlap of adjacent sub-channel pass bands. The total attenuation for a given individual sub-channel embedded in the H-DCR receiver 200 is the sum of baseband analog selectivity 410 and the selectivity response for the sub-channel of interest. By way of example, if the active sub-channel corresponds to selectivity response 430-1, then the total system level rejection for 430-1 in H-DCR system at an offset equal to −100 kHz is 124 dB, which is the sum of 17 dB attenuation from response 410 and 107 dB attenuation for response 430-1.

Figure 5:
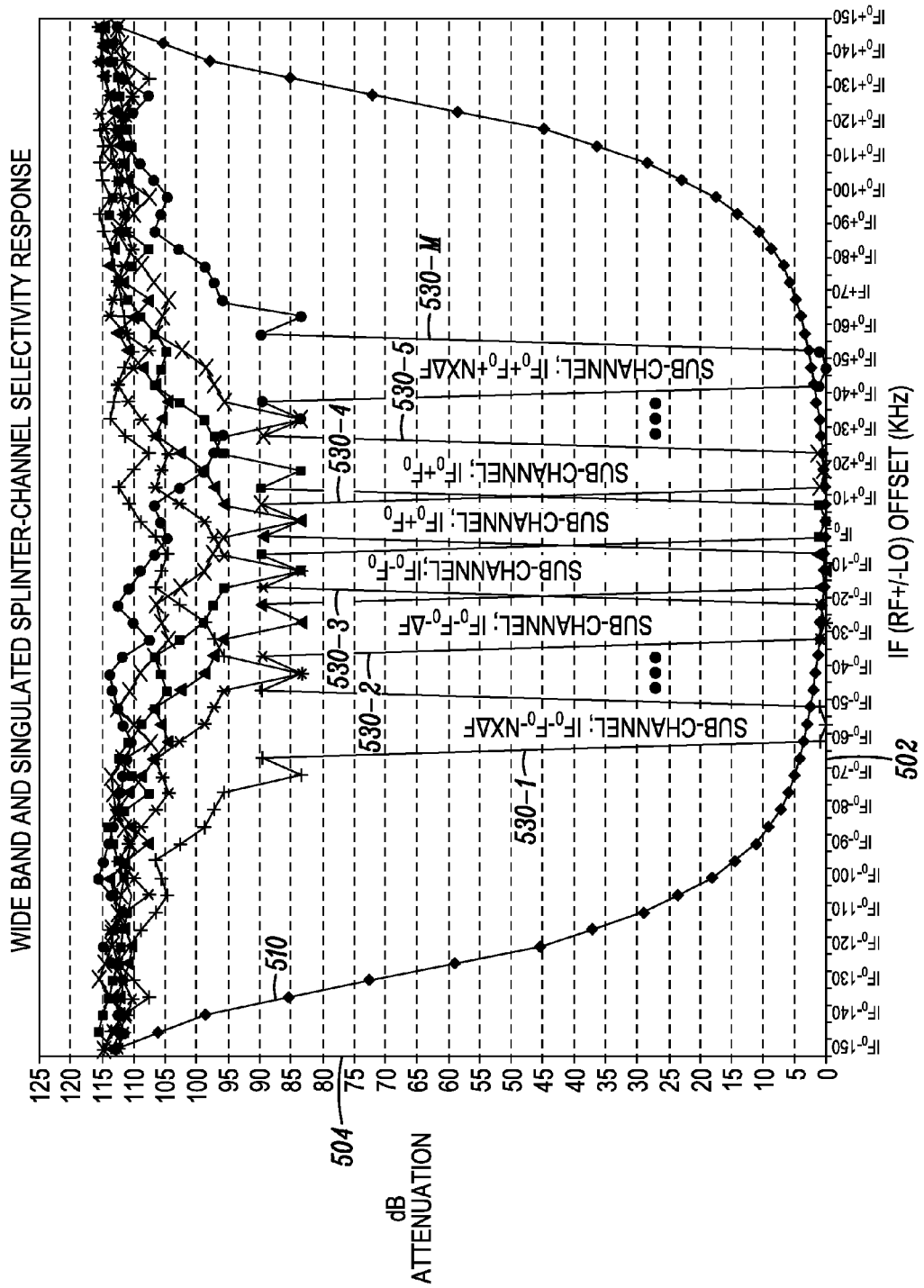
FIG. 5 depicts a graphical illustration of the hybrid DCR selectivity responses, including the wide band APIF selectivity and an associated splinter-channel partitioning of the APIF response into its constituent sub-channel selectivity responses with their respective offset relationships in the frequency domain.

FIG. 5 illustrates an alternative sub-channel frequency plan incorporating the selectivity responses 500 of various filter stages incorporated into H-DCR receiver 200. The selectivity responses in plot 500 illustrate a splinter-channel offset partition strategy for the APIF BW and are plotted on a Cartesian coordinated system where the X and Y axis are designated as 502 and 504 respectively. The X-axis 502 is coordinate to the frequency offset from a reference IF frequency as measured at a mixer output, where the mixer is incorporated into a specific front end branch which is receiving the desired RF signal as described in FIG. 2. The Y-axis 504 is coordinate to the decibels (dB) of attenuation realized as a function of frequency offset, where 0 dB denotes minimum attenuation and a higher dB number indicates a higher level of attenuation. Response 510 corresponds to 410 of FIG. 4, and exemplifies the wide-band APIF BW of analog processing block 212 for FIG. 2. As in the case for response 410 of FIG. 4, the baseband analog selectivity 510 is set to a predetermined BW (e.g., 500 kHz or more) depending on the number of sub-channels used to support simultaneous receive operations.

In addition to baseband analog selectivity 510, plot 500 illustrates a family of responses 530 containing a plurality of M sub-channels, where each sub-channel response is designated as 530-1, 530-2, 530-3 to 530-M. Each sub-channel is offset from other sub-channel responses by an integer multiple of offset frequency $\Delta F$, where $\Delta F$ is large enough to ensure that the pass band of one sub-channel is not co-located with the pass-band of an adjacent sub-channel. The sub-channels are symmetrically distributed about the reference frequency $IF_0$; however, unlike group 430 of FIG. 4, sub-channel group 530 does not contain a sub-channel centered exactly at $IF_0$. This is due to a fixed displacement frequency (Fo) summed with each offset frequency $\Delta F$ such that the reference frequency $IF_0$ falls in the stop band between contiguous sub-channels 530-3 and 530-4. Thus, for the sub-channel partitioning illustrated in FIG. 5, the baseband analog selectivity 510 contains M contiguous sub-channels, each sub-channel being uniquely defined at IF frequency $IF_0 \pm F_0 \pm N \times \Delta F$, where integer N ranges from 0, ±1, ±2, ±3 ... ±N. The number of sub-channels M comprising sub-channel group 530 is defined as M=2×N. Each sub-channel in group 530 may be distinguished from other sub-channels by its unique offset of $IF_0 \pm F_0 \pm N \times \Delta F$, where multiplier N may serve as the signed, sub-channel index used to track the sub-channel telemetry as described for AGC and Offset Translator 230 of FIG. 2. Thus, the offsets illustrated in FIG. 5 are related to a particular IF offset for H-DCR receiver 200 mixer output signals 209 (IF+$\Delta f_0$) and 239 (IF+$\Delta f_1$) of FIG. 2.

The offset frequency $\Delta F$ in FIG. 5 may vary between contiguous sub-channels within sub-channel group 530 dependent on the pass band BW of each sub-channel. If a particular sub-channel(s) pass band BW varies as dictated by a particular desired received signal protocol, then the corresponding offset $\Delta F$ for that sub-channel relative to the adjacent sub-channels may be adjusted to prevent overlap of adjacent sub-channel pass bands. Displacement frequency $F_0$ may also assume any arbitrary value as needed to shift the sub-channel's spectral location so as to avoid undesired spurious interference, or to facilitate channel interleaving between sub-channel group 430 of FIG. 4, and sub-channel group 530 of FIG. 5. The total attenuation for any given individual sub-channel is the sum of baseband analog selectivity 510 and the selectivity response for the sub-channel of interest. By way of example, if the active sub-channel corresponds to selectivity response 530-1, then the total system level rejection for 430-1 in H-DCR system at an offset equal to −100 kHz is 122 dB, which is the sum of 17 dB attenuation from response 410 and 105 dB attenuation for response 530-1.

The sub-channel group 430 of FIG. 4 and sub-channel group 530 of FIG. 5 can be adaptively interleaved using either Time Division Multiplexing (TDM) or Frequency Division Multiplexing (FDM) strategies to create a composite offset frequency relationship that combines FIG. 4 and FIG. 5. FDM is a form of signal multiplexing which involves assigning non-overlapping frequency ranges to different desired received signals. For FDM, the active sub-channels are sufficiently separated to prevent modulation from two different desired received signals from occupying the same spectrum at the same time. TDM is a type of multiplexing in which two or more signals are transferred using overlapping channels, or a single communication channel, but are physically separated in time (taking turns) on the channel. The time domain is divided into several recurrent timeslots of fixed length, one for each unique received signal being transmitted over the common channel, thereby allowing different received signals to be transmitted on a common signal without interfering with each other. The TDM or FDM interleaved offset frequency strategy affords the advantage of configuring the simultaneous active sub-channels to a predetermined offset within the baseband analog selectivity response 510 of FIG. 5 (410 of FIG. 4) to minimize undesired co-channel or spurious interference of the desired signals being simultaneously received.

Figure 6:
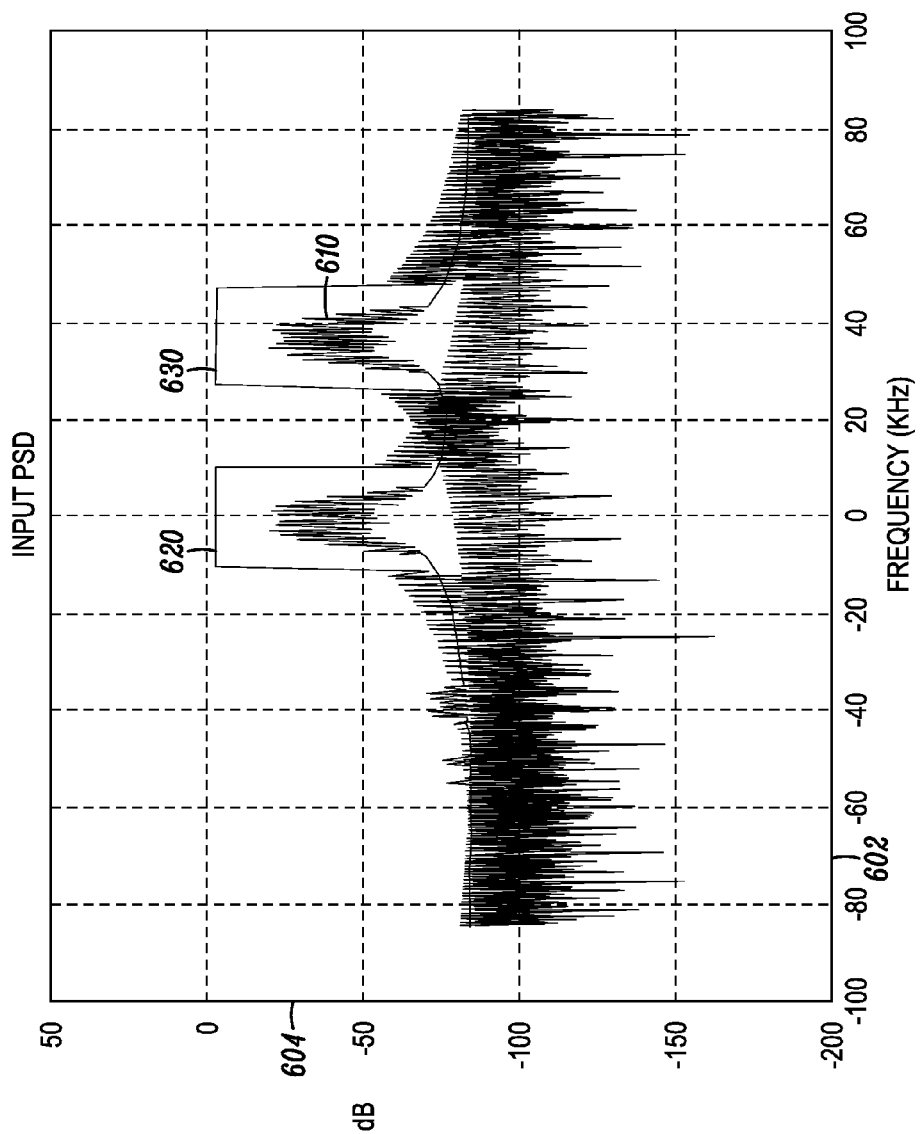
FIG. 6 depicts a graphical illustration of the hybrid DCR composite selectivity response for independent channels overlaid with a Frequency Domain representation of a composite signal containing down mixer output signals when receiving independent RF signals from different channels.

FIG. 6 illustrates a spectral plot of two desired signals being simultaneously received and their associated active sub-channel selectivity responses. The Power Spectral Density (PSD) 600 is plotted on a Cartesian coordinated system where the X and Y axis are designated as 602 and 604 respectively. The X-axis 602 is coordinate to the frequency offset from a reference IF frequency equal to 0 Hz, positioned at the center of the X-axis span. The Y-axis 604 is coordinate to the decibels (dB) of attenuation realized as a function of frequency offset, where 0 dB denotes minimum attenuation and a negative dB number indicates a higher level of attenuation.

Response 610 of FIG. 6 is a Fast Fourier Transform (FFT) of the complex IQ time domain signals incorporating two desired signal being simultaneously received as seen at the output of PMA 210 of FIG. 2. The first and second desired received signals are centered at approximately 0 kHz and +37.5 kHz respectively, with low level undesired spurious responses being visible at approximately −40 kHz and −50 kHz. The first and second desired signals are spectrally separated from each other sufficient to guarantee that their respective modulation signals do not overlap. Sub-channel selectivity response 620 is centered about 0 kHz and is associated with the first desired received signal, while sub-channel selectivity response 630 is centered at 37.5 khz and is associated with the second desired received signal.

Sub-channel 620 may represent the selectivity response of filter 304 of FIG. 3, while sub-channel 630 may represent the selectivity response of filter 334 of FIG. 3. Accordingly, selectivity response 620 attenuates signals not directly associated with the first desired received signal, including undesired spurious signals and the second desired received signal. Selectivity response 630 attenuates signals not directly associated with the second desired received signal, including the first desired received signal. In this manner, the first and second desired received signals are differentiated from each other, thereby facilitating correlated interference detection at Interference detector 350 of FIG. 3. In addition, the first and second desired received signals are continuously processed independent from and simultaneous to each other by tandem post-processing branches originating from DCOC block 310 and 340 respectively.

Figure 7:
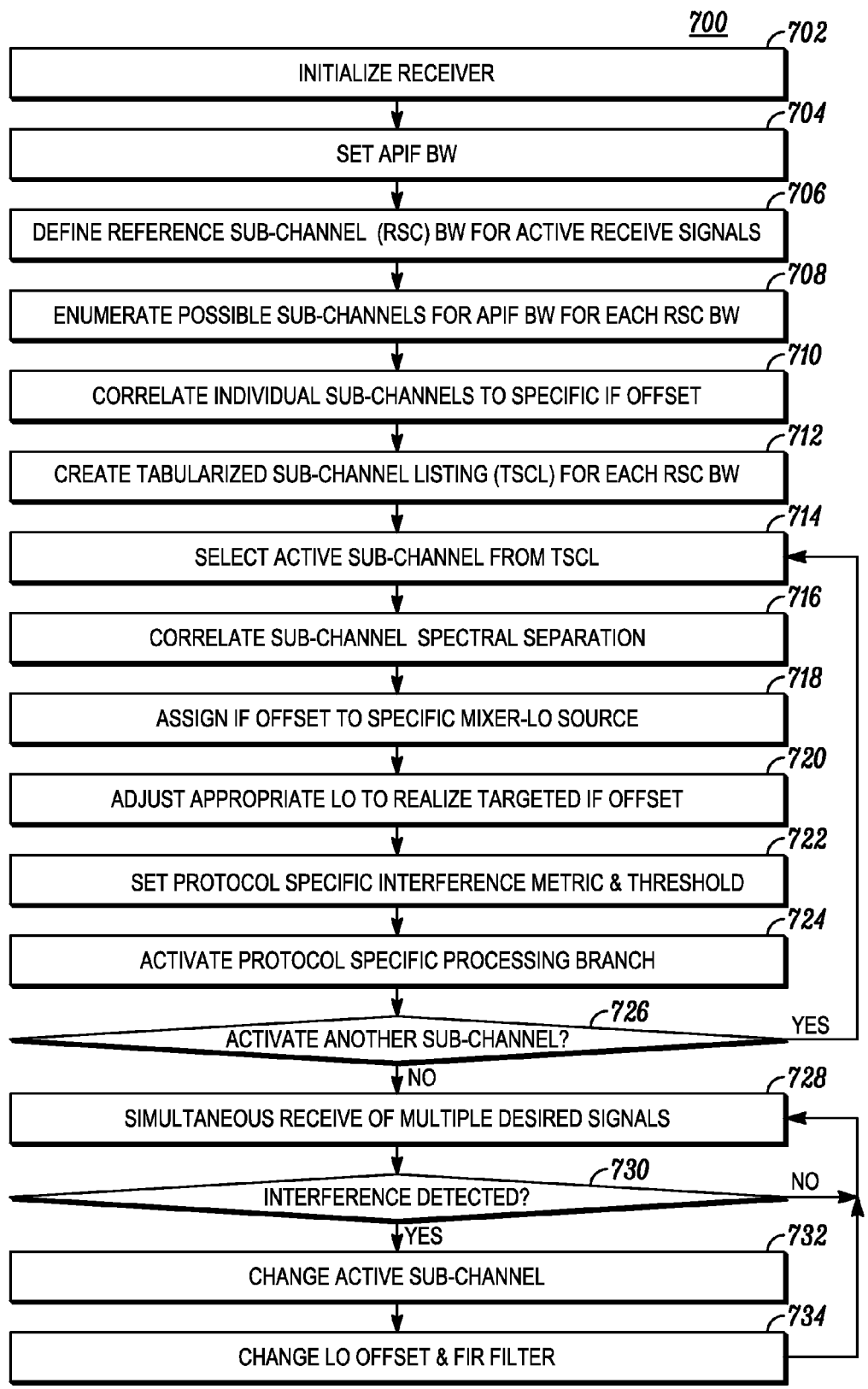
FIG. 7 depicts one embodiment of a methodology for activating a plurality of sub-channels to enable simultaneous reception of multiple signals as described in FIG. 2 and FIG. 3.

FIG. 7 is a flow chart showing a method 700 used to activate multiple sub-channels for processing of multiple received signals. In particular, method 700 delineates how DSP 270 and/or AFC and Offset Translator 230 of FIG. 2 tabularize possible sub-channels, activate multiple specific sub-channels for current use, and directs LO Offset Control 240 and MS-DCOC BLOCK 218 to iterate though alternative sub-channels when interference is detected on an active sub-channel. At step 702, the receiver is initialized and the blocks of receiver system 200 are configured for initial default operation. At step 704 the analog processor is set to an appropriate wide-band APIF BW setting that encompasses multiple sub-channel responses as described in FIG. 4 and FIG. 5. DSP 270 of receiver system 200 subsequently determines an appropriate IF BW for each of the desired signals to be received at step 706, as determined by its governing protocol. Typically, an IF BW for a 50 kHz channel spacing can range from 36 kHz to 20 kHz, an IF BW for a 25 kHz channel spacing can range from 18 kHz to 8 kHz, and an IF BW for a 12.5 kHz channel spacing can range from 8.5 kHz to 5 kHz depending of the modulation type of the desired received signal. The IF BW for a given desired received signal is defined as the Reference Sub-Channel (RSC) BW for that received signal; therefore, each of the desired received signals that are to be simultaneously processed have an associated RSC BW.

Once all RSC BWs are determined, the host partitions the APIF BW into contiguous sub-channel allocations for each of RSC BW settings at step 708. Example partition strategies for parsing the APIF BW are described in FIGS. 4 and 5, with the total number of possible sub-channels being equal to $$2 \times \frac{APIFBW}{RSCBW} - 1$$

when combining both non-offset and splinter-channel partition strategies where $F_0=0.5\times(RSC\ BW)$ of FIG. 5. At step 710, each of the possible sub-channel assignments defined in step 708 is related to a particular IF offset. A Tabularized Sub-Channel Listing (TSCL) is created at step 712 for each desired signal that is to be received simultaneously, each desired received signal being associated with a specific RSC BW. Each TSCL functions as a memory map that delineates possible sub-channels for a particular desired received signal, where each sub-channel is indexed and related to a specific IF offset from a reference IF frequency. Each sub-channel's TSCL index is scaled to the IF offset from the reference IF frequency; thus, a sub-channel index serves as a first order approximation of spectral separation between active sub-channels. The sub-channel indices for all TSCL's are assigned in similar fashion. The TSCL also records which LO-mixer pair is assigned to the active sub-channel. The TSCL is updated during normal receive operations with sub-channel telemetry, including but not limited to: which sub-channel is active, past interference status for previously active sub-channels, and spectral separation to other active sub-channels as itemized on different TSCL's associated with other desired received signals.

At step 714, a sub-channel is selected for activation based on channel availability, including index proximity to other active sub-channels as listed in their respected TSCL's, and interference status for the sub-channel being activated. As previously noted, the TSCL index serves as a first order approximation of spectral separation to other active sub-channels. Interference status for a sub-channel is accomplished by reviewing the interference status listed on the TSCL and checking the SOS energy estimate for that sub-channel is below an acceptable threshold (refer to FIG. 8). After an active sub-channel is selected at step 714, it is cross-correlated to all other active sub-channels as registered in their respective TSCL's at step 716 to generate a detailed coordinate of spectral separation between active sub-channels. Cross-correlation at 716 is used as the RSC BW for each TSCL may be different, and thus a more detailed analysis than simple index proximity testing may be used. The cross-correlation is performed recursively for each active sub-channel as it is selected during initial receiver start up, or as part of the interference mitigation strategy. An active sub-channel may be reassigned to a different TSCL index to further optimize spectral separation between active sub-channels if the newly selected sub-channel's spectral proximity to a currently active sub-channel is too small (e.g.—less then one channel spacing).

After the active sub-channel index has been finalized, the appropriate IF offset is read from the TSCL and assigned to a particular LO source associated with the appropriate down-conversion mixer at step 718. Subsequent to 718, the frequency of the LO source is adjusted to the specified offset at 720 thereby enabling its associated mixer to produce an output signal that incorporates the appropriate IF offset assigned to the active sub-channel. At step 722, an interference metric is selected as appropriate for the desired received signal, and a threshold is set by which the presence or absence of an interference signal may be ascertained. For example, if SQE is selected as a receive metric for a first received signal with an associated interference threshold of 80%, then if the SQE degrades below 80% during nominal receiver operations for a first received signal it may be concluded that the active sub-channel is being degraded by interference and an alternative sub-channel may be selected. However, BER may be the receive metric for a second received signal with an associated interference threshold of 5%, whereupon if BER rises above 5% during nominal receiver operation for the second received signal an alternative sub-channel may be selected. Thus, the metric used for different sub-channels may be the same or may differ. Finally, a protocol specific processing branch appropriately configured for the desired received signal (refer to FIG. 3 description) is activated at step 724. At step 724 the appropriate digital coefficients are loaded into the FIR filter that corresponds to the IF offset of the active sub-channel. Steps 714, 716, 718, 720, 722 and 724 taken together comprise one methodology by which method 700 activates a particular sub-channel and assigns the sub-channel to a particular desired received signal.

At step 726, the receiver queries whether another sub-channel is desired to support another desired signal that is to be simultaneously received. If another sub-channel is desired, method 700 branches from step 726 back to step 714 where the previously described processing iterates through steps 714, 716, 718, 720, 722, and 724 to activate another sub-channel. Method 700 thus branches from 726 to step 714 for each desired signal that is to be simultaneously received, where a new sub-channel is selected from a different TSCL appropriate for that desired signal, and the appropriate LO source is configured for the correct operating frequency. Once all sub-channels have been activated, method 700 continues to step 728 where simultaneous processing of multiple independent desired received signals is accomplished.

Periodically, as set by protocol requirements, method 700 branches to step 730 where the sub-channel interference metrics are checked to see if any of the sub-channels are being degraded by interference. If no interference is detected, nominal simultaneous receive operations continue at step 728. However, if interference is detected for any of the active sub-channels, method 700 branches from 730 to step 732 to select a replacement sub-channel for the degraded, active sub-channel. After a new sub-channel is selected at step 732, method 700 branches to step 734 where the LO source associated with the degraded sub-channel is changed in conjunction with updating the FIR filter coefficients to track to a new IF offset. After the LO frequency has been changed, synchronized to the FIR filter response change, method 700 branches back to step 728 to resume nominal simultaneous receive operations. Further details of steps 732 and 734 are provided in relation to FIG. 8, although interference detection step may be eliminated if it is known a priori that there could be no VLIF-to-DCR interference due to system design.

Figure 8:
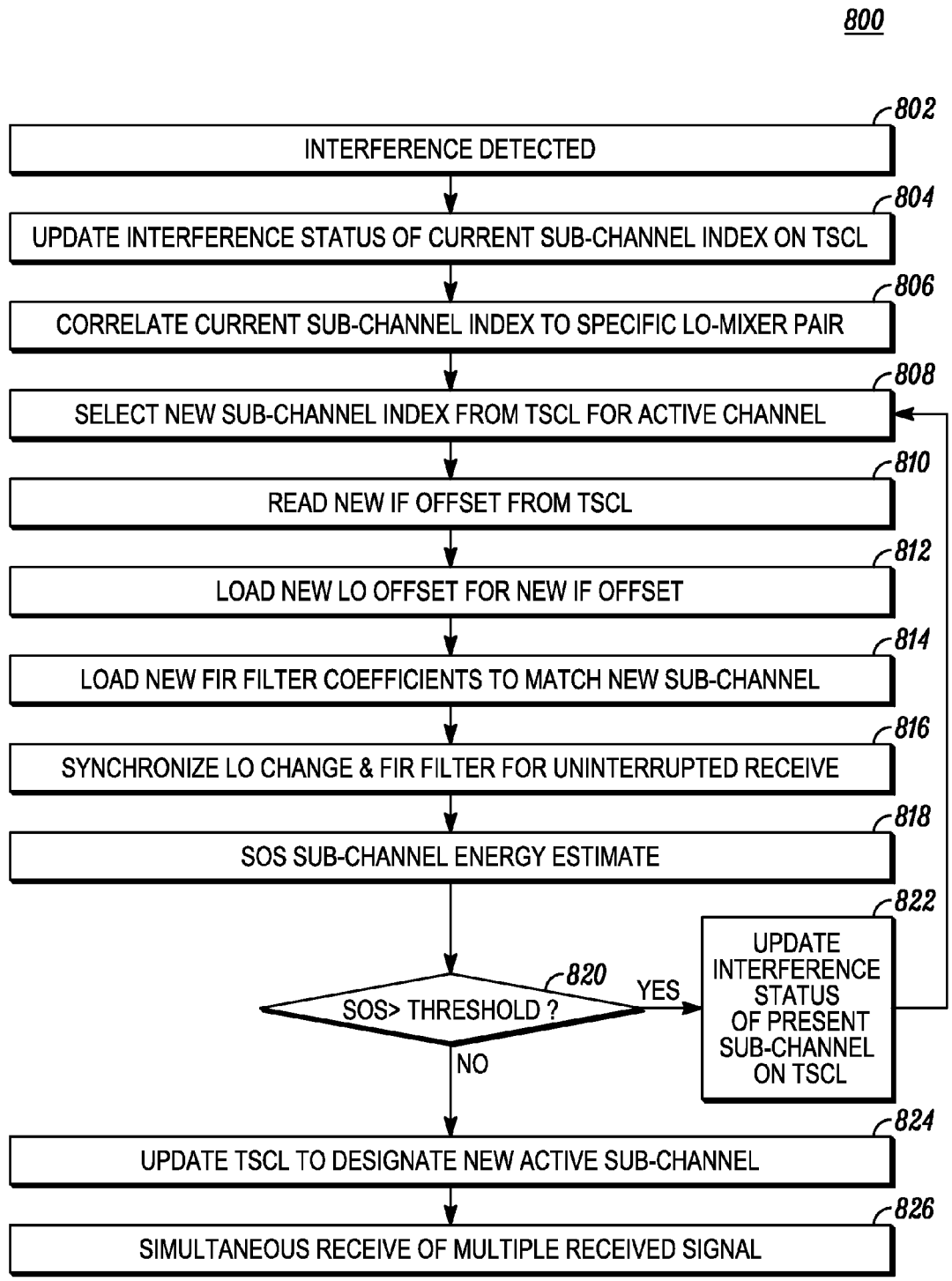
FIG. 8 depicts one embodiment of a methodology for mitigating interference through agile-LO sequencing to enable simultaneous reception of multiple signals as described in FIG. 2 and FIG. 3.

FIG. 8 is a flow chart illustrating a methodology 800 that enables the agile-LO sequencing used to mitigate interference while simultaneously receiving multiple independent signals. In particular, method 800 may be initiated at step 802 after interference has been detected on an active sub-channel. Step 802 of method 800 corresponds to an affirmative result-ant to the interference query of step 730 of method 700. Once interference is detected, method 800 updates the interference status for the current sub-channel index on the appropriate TSCL at step 804, and reads back the associated LO source identifier for the current sub-channel at step 806. Subsequent to identifying the LO-mixer source from which the degraded desired received signal is originating, method 800 selects a new sub-channel index from the TSCL at step 808 that is sufficiently offset from the current active sub-channels, including the current degraded sub-channel. Once a new sub-channel index has been selected, method 800 reads its corresponding IF offset for the new sub-channel from the appropriate TSCL at 810 and translates the new IF offset to a new LO frequency, which is subsequently programmed into the LO source at step 812 that had previously been affiliated with the degraded desired received signal at step 806. Then at step 814, new digital coefficients are loaded into the FIR selectivity filter incorporated into the particular digital processing branch associated width the degraded received signal. While a new LO frequency and new FIR coefficients are loaded into their respective receiver block at step 812 and 814 respectively, they do not take effect until step 816. At step 816, both the LO source and FIR filter response changes are synchronized to minimize interruption of the desired received signal.

Once the new sub-channel is activated, the Sum-of-Squares (SOS) vector magnitude detector may process the new sub-channel signals in the absence of the desired received signal at step 818. The SOS detector provides a protocol agnostic, energy estimate of the composite, complex IQ sub-channel signals proportional to an on-channel signal power. Thus, if there is a previously undetected interference signal on the new sub-channel, it will be detected at step 818. At step 820, the SOS energy estimate is compared to a predefined threshold to determine whether the interference energy, if any, is sufficient to warrant a new sub-channel selection. If the SOS energy estimate is greater than a predefined threshold, thereby indicating an interference signal power sufficient to degrade any desired received signals, method 800 branches from query 820 to step 822 where the interference status for the sub-channel is updated on its associated TSCL to indicate the presence of an interferer. Subsequent to updating the TSCL at 822, a new sub-channel index is selected at step 808, where upon the previously described sequence from step 808 through 820-822 may be repeated until a sub-channel is found that exhibits a SOS energy estimate indicative of minimal interference.

Steps 808, 810, 812, 814, 816, 818, 820, and 822 form a recursive sub-channel selection process whereby each new sub-channel is screened for initial interference prior to the resumption of receiver processing of the desired received signal. Any number of threshold weighting strategies may be employed at query step 820 so as to select the sub-channel exhibiting the least interference level. For example, if every sub-channel delineated in the TSCL exhibits some level of interference, then sub-channel selection process 808 through 820-822 iterates though all indices of the TSCL. After checking the sub-channels with an initial threshold, resulting in the rejection of these sub-channels, the threshold at query step 820 may be interactively scaled (i.e., weighted) to identify a sub-channel having the least interference power. While a sub-channel selected using a weighted threshold may not provide optimum, interference-free receive performance, it may provide sufficient signal fidelity so as to prevent catastrophic loss of the desired signal reception.

Once a new sub-channel's SOS energy estimate falls below the predefined threshold setting at query step 820, method 800 proceeds to update the appropriate TSCL at 824, designating which sub-channel has been selected for active processing of the desired received signal, and the associated interference level, if any. After the TSCL has been updated with all pertinent information related to the new active sub-channel, simultaneous receive operations of multiple received signals continues at step 826. Step 826 of method 800 corresponds to step 728 to method 700, and steps 804, 806, 808, and 810 of method 800 may correspond in part or in whole to step 732 of method 700. Steps 812, 814, 816, 818, and 820 of method 800 may be incorporated in part or in whole into step 734 of method 700. While method 800 is being employed to select a new sub-channel associated with a specific TSCL, the other received signals being simultaneously received and operating on other sub-channels, indexed to different TSCL's, may continue normal receive operations, with associated processes continuing in parallel to method 800.

As above, the receiver system described is agnostic to various characteristics of the received desired signals such as channel spacing (e.g., 6.25, 12.5, 25 or 50 kHz), modulation (e.g., APCO, FM, F2, Harmonized, HPD, Tetra, TEDs), and frequency bands (e.g., VHF, UHF, 700/800, or 900 MHz).

The receiver system described simultaneous reception of the same or different types of information. In one example, multiple voice communications can be received and monitored, allowing the user to switch to a higher priority received signal when present. In another example, different voice and data applications may be received, permitting the user to listen to audio while simultaneously monitoring location, web applications, or mission critical data. When the receiver system is used in trunked systems, it permits simultaneous monitoring of both the voice and control channels. The voice channel can be in "talk around" (direct mode) or "trunked voice" (trunked mode) mode.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

While various embodiments of the invention have been described, it will be apparent to those of ordinary skill in the art that other embodiments and implementations are possible within the scope of the invention. Accordingly, the invention is not to be restricted except in light of the attached claims and their equivalents.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure.

The invention claimed is:

1. A receiver system for simultaneously receiving a plurality of RF signals each having a dedicated RF channel, the receiver system comprising:
a plurality of programmable local oscillator "LO" sources each configured to provide a LO signal of a particular frequency;
a plurality of receiver front end branches each containing a mixer, each mixer using a different one of the LO signals to convert one of the RF signals to a unique intermediate frequency "IF" signal, each IF signal having a different IF frequency offset from a reference IF frequency;
a processing block containing sub-channels and configured to provide gain and filtering for the IF signals, each sub-channel related to a different IF frequency offset such that each IF signal occupies a different sub-channel, a bandwidth of the processing block being wider than a number of sub-channels that is greater than the number of mixers;
a multi-channel selectivity DC offset correction "MS-DCOC" block configured to provide selectivity responses matched to the sub-channels to provide DC offset correction, the selectivity responses dynamically adjusted by changing coefficients of filters in the MS-DCOC block; and
a LO offset control configured to independently adjust the LO sources dependent on characteristics of the IF signals provided by the MS-DCOC block.

2. The receiver system of claim 1, wherein the RF signals are independent of each other.

3. The receiver system of claim 2, wherein each receiver front end branch is configured to receive and filter RF signals to provide one of the RF signals to a different one of the mixers, the receiver system further comprising a processor configured to dynamically configure parameters of subsystem blocks of the receiver system based on characteristics of the RF signals and operational status of the subsystem blocks.

4. The receiver system of claim 1, wherein the MS-DCOC block defines a particular sub-channel response within the processing block bandwidth for each of the RF signals to be simultaneously received such that different sub-channels are able to have different DC correction algorithms.

5. The receiver system of claim 1, further comprising:
an interference detector configured to detect sub-channel interference; and
a translator configured to identify whether each sub-channel is degraded from an output of the interference detector, to select a new sub-channel in the IF bandwidth of the processing block for each identified sub-channel, and to provide a translation signal to the LO offset control to adjust the LO source associated with each identified sub-channel to switch to a different one of the new sub-channels.

6. The receiver system of claim 5, wherein the interference detector is configured to detect interference on a particular sub-channel depending on at least one of: a plurality of metrics including received signal energy within the particular sub-channel, a protocol of a desired on-channel signal assigned to the particular sub-channel, a modulation of the desired on-channel signal assigned to the particular sub-channel, and demodulated signal fidelity of the desired on-channel signal assigned to the particular sub-channel.

7. The receiver system of claim 5, wherein the interference detector is further configured to:
measure a primary metric of each sub-channel,
if the interference detector determines that the primary metric of a particular sub-channel exceeds a predefined threshold, measure a secondary metric and correlate the secondary metric to determine a receive status of the particular sub-channel, and
if the interference detector determines from the secondary metric that the status of the sub-channel is an unacceptably degraded RF signal or an interferer, then to designate to the translator the particular sub-channel as a degraded sub-channel.

8. The receiver system of claim 7, wherein the translator is further configured to:
de-prioritize each corrupted sub-channel such that the degraded sub-channel is not as frequently selected as one of the new sub-channels,
select the new sub-channel,
indicate the new sub-channel to the MS-DCOC block, and
communicate LO offset information of the new sub-channel to the LO offset control.

9. The receiver system of claim 8, wherein changes to the LO source due to the LO offset control and coefficients defining filter responses in the MS-DCOC block are synchronized when switching from the degraded sub-channel to the new sub-channel.

10. The receiver system of claim 9, wherein the MS-DCOC block performs independent, sub-channel specific DC offset correction optimized to the on-channel signals, synchronized to the changes in the LO source.

11. The receiver system of claim 8, wherein when selecting the new sub-channel the interference detector is further configured to:
determine an energy estimate of a signal on the new sub-channel,
compare the energy estimate to a predefined energy threshold to determine whether interference on the new sub-channel is sufficient to unacceptably degrade a desired on-channel signal, and
continue to select a different sub-channel until a final sub-channel is found that exhibits an energy estimate indicative of an acceptable amount of interference.

12. The receiver system of claim 11, wherein when continuing to select a different sub-channel, if no sub-channel is determined to have interference whose energy estimate is less than the predefined energy threshold, the interference detector is further configured to iteratively scale the predefined energy threshold to identify a sub-channel having the least interference power.

13. The receiver system of claim 5, wherein the translator is further configured to:
monitor a netting error for each sub-channel unencumbered by interference, and
communicate to the LO offset control the LO source to be adjusted and a magnitude of frequency adjustment of the LO source to minimize the netting error.

14. The receiver system of claim 5, wherein during receiver initialization the translator is further configured to:
tabularize possible sub-channels for the processing block,
associate each sub-channel with a unique IF offset so as to spectrally occupy the sub-channel, and
affiliate the IF offset to a specific LO source.

15. The receiver system of claim 3, wherein each receiver front end branch further comprises a Low Noise Amplifier "LNA" in which each LNA is independently adjusted to provide an appropriated amount of gain for amplifying a signal provided thereto, the system further comprising:
- a plurality of detectors each configured to detect off-channel interferers spectrally co-located with desired on-channel signals;
- an analog-to-digital converter "ADC" configured to digitize signals from the processing block; and
- an automatic gain control "AGC" state machine configured to receive an ADC signal from the ADC, a MS-DCOC signal from the MS-DCOC block, and off-channel detector signals from the detectors and to independently adjust the gain of each LNA to optimize a signal metric for each desired on-channel signal being amplified by the LNA,
- wherein each detector is incorporated into a different receiver front end branch and is configured to detect the off-channel interferers in an output signal from the receiver front end branch.

16. The receiver system of claim 15, wherein a sample rate of the ADC exceeds a rate twice a bandwidth of the processing block and is dependent on protocol requirements of the IF signals.

17. The receiver system of claim 1, wherein a bandwidth of each RF signal is the same as a bandwidth of the corresponding sub-channel.

18. The receiver system of claim 1, wherein bandwidths of the sub-channels are able to be different.

19. The receiver system of claim 1, wherein DC offset correction provided by the MS-DCOC varies for each sub-channel depends on a modulation type of on-channel signal occupying the sub-channel and desired accuracy of the compensation.

* * * * *

UNITED STATES PATENT AND TRADEMARK OFFICE
CERTIFICATE OF CORRECTION

PATENT NO. : 8,320,858 B2
APPLICATION NO. : 12/951235
DATED : November 27, 2012
INVENTOR(S) : Ruelke et al.

It is certified that error appears in the above-identified patent and that said Letters Patent is hereby corrected as shown below:

In the Specifications

In Column 6, Line 64, delete "$(\Delta_0)$." and insert -- $(\Delta f_0)$. --, therefor.

In Column 21, Line 19, delete "then" and insert -- than --, therefor.

In Column 22, Line 42, delete "width" and insert -- with --, therefor.

Signed and Sealed this
Twenty-third Day of April, 2013

Teresa Stanek Rea
*Acting Director of the United States Patent and Trademark Office*